(12) United States Patent
Rafkind et al.

(10) Patent No.: US 11,943,282 B2
(45) Date of Patent: *Mar. 26, 2024

(54) SYSTEM FOR PROVIDING SYNCHRONIZED SHARING OF AUGMENTED REALITY CONTENT IN REAL TIME ACROSS MULTIPLE DEVICES

(71) Applicant: Iris Tech Inc., Santa Fe, NM (US)

(72) Inventors: Nicholas Rafkind, Santa Fe, NM (US); Steve Lukas, Venice, CA (US)

(73) Assignee: Iris XR Inc., Venice, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,329

(22) Filed: Dec. 5, 2022

(65) Prior Publication Data
US 2023/0106709 A1 Apr. 6, 2023

Related U.S. Application Data

(63) Continuation of application No. 17/075,443, filed on Oct. 20, 2020, now Pat. No. 11,522,945.

(51) Int. Cl.
| | |
|---|---|
| *H04L 67/10* | (2022.01) |
| *G02B 27/01* | (2006.01) |
| *G06F 9/54* | (2006.01) |
| *G06T 19/00* | (2011.01) |
| *H04L 65/60* | (2022.01) |

(52) U.S. Cl.
CPC .......... *H04L 67/10* (2013.01); *G02B 27/0172* (2013.01); *G06F 9/54* (2013.01); *G06T 19/006* (2013.01); *H04L 65/60* (2013.01)

(58) Field of Classification Search
CPC ..... G06F 8/60; G06F 9/46; G06F 9/54; G02B 27/01; G02B 27/0172; G02B 2027/014; G02B 2027/0178; G02B 2027/0187; G06T 19/00; G06T 19/006; G06T 7/00; H04L 65/60; H04L 65/403; H04L 65/1089; H04L 12/18; H04M 3/56; H04N 7/15; H04W 4/02; H04W 4/021; H04W 4/025
USPC .......................................................... 709/201
See application file for complete search history.

(56) References Cited

U.S. PATENT DOCUMENTS

| | | | |
|---|---|---|---|
| 9,582,516 B2 | 2/2017 | McKinnon et al. | |
| 10,692,287 B2 | 6/2020 | Evans et al. | |
| 11,201,981 B1* | 12/2021 | Suiter | G06Q 30/0639 |
| 2015/0346722 A1* | 12/2015 | Herz | G01S 19/13 701/2 |
| 2016/0133230 A1* | 5/2016 | Daniels | G06F 3/147 345/633 |
| 2017/0243403 A1* | 8/2017 | Daniels | G06F 3/1454 |
| 2017/0249745 A1* | 8/2017 | Fiala | A63F 13/65 |
| 2018/0165854 A1* | 6/2018 | Du | G06F 16/00 |
| 2018/0284802 A1* | 10/2018 | Tsai | G06V 20/20 |

(Continued)

OTHER PUBLICATIONS

US 10,614,630 B2, 04/2020, Samec et al. (withdrawn)

(Continued)

*Primary Examiner* — James N Fiorillo
(74) *Attorney, Agent, or Firm* — Brown Rudnick LLP; Matthew P. York

(57) ABSTRACT

The invention generally relates to managing and sharing augmented reality (AR) content, and, more specifically, to an AR platform providing synchronized sharing of AR content in real time across multiple AR devices.

20 Claims, 20 Drawing Sheets

(56) References Cited

U.S. PATENT DOCUMENTS

| | | | |
|---|---|---|---|
| 2019/0094981 A1* | 3/2019 | Bradski | H04N 21/414 |
| 2019/0114802 A1* | 4/2019 | Lazarow | H04W 56/001 |
| 2020/0066044 A1* | 2/2020 | Stahl | G06V 20/20 |
| 2020/0066045 A1* | 2/2020 | Stahl | G06T 19/20 |
| 2020/0066046 A1* | 2/2020 | Stahl | G06T 19/006 |
| 2020/0320955 A1* | 10/2020 | Kiser | A63F 13/5255 |
| 2020/0394410 A1* | 12/2020 | Zhang | G01C 21/1656 |
| 2021/0019527 A1* | 1/2021 | Zhang | G06V 10/44 |
| 2021/0110615 A1* | 4/2021 | Zhao | G06T 19/006 |
| 2021/0174097 A1* | 6/2021 | Tsai | G06T 7/70 |
| 2021/0240986 A1* | 8/2021 | Gurajapu | G05D 1/0038 |
| 2021/0256768 A1* | 8/2021 | Zhao | G06F 16/907 |
| 2021/0256769 A1* | 8/2021 | Bailey | G06T 19/006 |
| 2021/0279949 A1* | 9/2021 | Cao | G06F 3/011 |
| 2021/0279953 A1* | 9/2021 | Bouhnik | G06T 17/05 |
| 2021/0312713 A1* | 10/2021 | Peri | H04L 67/75 |
| 2021/0335049 A1* | 10/2021 | Miller | H04L 67/10 |
| 2021/0343087 A1* | 11/2021 | Gomez Gonzalez | G06F 3/011 |
| 2021/0349528 A1* | 11/2021 | Son | G06F 3/013 |
| 2021/0398314 A1* | 12/2021 | Sivalingam | G06F 3/0346 |
| 2023/0298280 A1* | 9/2023 | Jouet | G06T 15/04 |
| | | | 345/633 |

OTHER PUBLICATIONS

Flavián, 2019, The impact of virtual, augmented and mixed reality technologies on the customer experience, Journal of Business Research, 100, 547-560.

Li; Google's launches persistent Cloud Anchors for creating AR layers over the real world; 9T05Google, Oct. 6, 2020 at https://9to5google.com/2020/10/06/google-persistent-cloud-anchors/.

Magic Leap 1—A Thousand Breakthroughs in One, https://www.magicleap.com/en-us/magic-leap-1, accessed on Jan. 26, 2021, 5 pages.

Microsoft Docs—Shared experiences in mixed reality, https://docs.microsoft.com/en-us/windows/mixed-reality/develop/platform-capabilities-and-apis/shared-experiences-in-mixed-reality, accessed Jan. 26, 2021, 12 pages.

Microsoft HoloLens 2—Mixed Reality Technology for Business, https://microsoft.com/en-us/hololens, accessed on Jan. 26, 2021, 5 pages.

The Niantic Real World Platform: Mapping, Sharing and Understanding Reality, Nov. 6, 2019 at https://nianticlabs.com/blog/nrwp-update-110619/.

* cited by examiner

SYSTEM FOR PROVIDING SYNCHRONIZED SHARING OF AUGMENTED REALITY CONTENT IN REAL TIME ACROSS MULTIPLE DEVICES

CROSS-REFERENCE TO RELATED APPLICATIONS

This application is a continuation of U.S. patent application Ser. No. 17/075,443, filed Oct. 20, 2020, the content of which is incorporated by reference herein in its entirety.

FIELD OF THE INVENTION

The invention relates to augmented reality platforms, and, more particular, to a system for providing synchronized sharing of augmented reality content in real time across multiple augmented reality-capable devices within a given physical environment or space.

BACKGROUND

Augmented reality (AR) is a live view of a physical, real-world environment in which elements are "augmented" by computer-generated perceptual information. Unlike virtual reality, which creates a totally artificial environment, augmented reality uses the existing environment and overlays new information on top of it. The overlaid information may be constructive (i.e. additive to the natural environment) or destructive (i.e. masking of the natural environment). In particular, the overlaid, computer-generated information is spatially registered with the physical world such that the overlaid information may be perceived as an immersive aspect of the real environment. As such, augmented reality is intended to alter a user's current perception of a real-world environment, as opposed to virtual reality that replaces the real-world environment with a simulated one.

One of the benefits of augmented reality is that it allows components of the digital world to be brought into a person's perception of the real world through the integration of immersive sensations that are perceived as natural parts of an environment. For example, augmented reality systems may enhance a person's conception of reality through a variety of sensory modalities, such as visual, auditory, haptic, and olfactory. Most augmented reality systems provide a wearable device, generally in the form of a headset to be worn by the person which includes a video or graphic display through which augmented views of the real-world environment are presented to the wearer. Some augmented reality systems allow for a person to use a personal computing device equipped with appropriate camera hardware and a display, such as a smartphone or tablet.

While current systems may be able to provide a person with some form of augmented reality experience, current systems have drawbacks. Most notably, current augmented reality systems, as well as virtual reality systems for that matter, generally provide a personal-centric experience, which is focused solely on the immediate user's movement and interaction with the augmented reality content. As such, use of current augmented reality systems can often be an isolating, individual experience.

SUMMARY

The present invention is directed to a system including an augmented reality (AR) platform providing synchronized sharing of AR content in real time and across multiple AR-capable devices within a controlled, physical environment or space. In particular, the system of the present invention includes a mesh network of technologies integrated with one another and used to ultimately establish alignment of digital content, including rendering thereof, against a physical environment or space. Such a system allows for multiple users to experience the same AR content rendering in real time and within a live, physical environment or space, wherein such rendering of AR content is adapted to each user's point of view.

More specifically, the system includes the use of a physical, real-world environment, preferably a controlled space (i.e., a room or at least partially enclosed space) in which the AR content is to be presented to multiple users (via each user's AR-capable device). The use of a controlled space allows for the system of the present invention to provide a persistently shared experience dedicated to the specific space. In some embodiments, the environment may include multiple controlled spaces that are part of an overall AR experience to be provided to the users (i.e., multiple rooms or spaces at a particular venue, such as multiple spaces representing various exhibits at an AR-based zoo).

For any given controlled space, a shared point is initially established (also referred to herein as "world origin point" or "world origin"). The world origin point is generally defined as a specific position and orientation within the given space, which may be based on coordinate data (e.g., a coordinate axis system, including an x,y,z position and x,y,z orientation). Establishing a world origin point within the controlled space allows for the AR platform to place digital content relative to the world origin point for subsequent rendering across multiple AR-capable devices. The controlled space is digitally mapped, such that digital data associated with the controlled space, including the world-origin point coordinate data, is stored for subsequent retrieval and use during rendering of AR content. Each participating AR-capable device (i.e., AR-headset, smartphone, tablet, or other computing device that is AR-capable) within the controlled space essentially agrees upon the established world origin point, thereby allowing for digital content (e.g., images) to consistently appear in the same, real-world location in the controlled space for each individual device as a result of one or more localization and subsequent re-localization processes for each device, as described in greater detail herein.

In addition, the system further relies on image tracking for alignment purposes. For example, the physical space can be decorated using image marker technology. Use of image marker technology allows for canonically established images to represent coordinates associated with the world origin point. For example, at the start of a given AR session or experience, devices with image tracking technology can utilize one or more image trackers (i.e. physical markers) within a given space to localize into the space and align the AR session to the world origin point. The localized coordinates of each image marker along with a unique image marker identifier is stored for each image for subsequent retrieval and use by each device, thereby allowing devices to understand the space without requiring any individual device setup.

The AR platform further coordinates the world origin point of a given controlled space with anchor-based localization to thereby align the multiple devices. In particular, each device may be running an anchor-based software algorithm unique to that device's given platform. Anchors are understood to include generated locations that represent a physical location of the associated device in the real world and stored as serialized data (e.g., in the form of coordinate data). In some embodiments, the devices may be running respective cloud anchoring systems. Additionally, some devices may be running respective persistent anchoring systems. For each cloud anchoring system, for example, anchors will be established for each integrated platform in a similar manner to image markers. However, in the present system, cloud anchors are established using a computer vision-based mesh understanding of the physical world. As previously described, each device within the controlled space essentially agrees upon the established world origin point, such that each device localizes into the space based, at least in part, on established anchors for that device (i.e., correlation of anchor data with world origin point data).

Upon a set of devices localizing into the controlled space using at least one of the image tracking and cloud anchoring techniques, the AR platform allows for dynamic, real-time localization across all devices in the given space. Each device will determine, through a series of checks, whether to start generating temporary cloud anchors for more accurately sharing an AR experience with new devices that enter the space. As image tracking can require positioning devices in close proximity to image markers, temporary cloud anchors provide an advantage of allowing more devices to arbitrarily localize into the space without having a multitude of viewers try to crowd into the same vantage point.

The system of the present invention further accounts for drift. For example, devices may be continuously re-localizing into the real world through a series of sensors, which may include an RGB camera, Lidar sensors, inertial measurement unit (IMU), motion sensors, infrared, or other tracking system. Such sensors are all subject to disruption, which can interfere with the device's understanding of its position and orientation in the real-world environment. Accordingly, as a result of such disruption, the digital AR content provided may shift from its originally localized world origin, resulting in a phenomenon known as drift, which can cause digitally placed objects to shift to incorrect locations as a result.

To counter the effects of drift and to make the system easy to use for each user, the system of the present invention provides for automatic and repeated localization (i.e., re-localization) for any device. In particular, for a given AR experience that may include multiple controlled spaces (e.g., multiple exhibits in an AR-based zoo, for example), multiple locations within the real-world environment may be designated as re-localization points, in which any given user's proximity may be detected via a proximity sensor, such as a near-field communication-based device. For example, proximity sensors may include Bluetooth Low-Energy (BLE) sensors. Upon being detected, a near-field communication-based sensor may communicate with the AR platform and/or device and subsequently initiate a re-localization process, in which the device will automatically attempt to re-localize (requiring no direct input or interaction from the user). Such re-localization points can be placed throughout a given AR experience at regular intervals that users (i.e., guests or participants) must necessarily pass through and are encouraged to come closer as part of the attraction(s). Accordingly, the system of the present invention provides for continuous re-alignment of the dynamic world origin point through a combination of the use of the physical image markers as well as disparate cloud services of each device to maintain the associated coordinates consistently across device software systems throughout the duration of each AR session/experience.

Accordingly, the system of the present invention addresses the drawbacks of current augmented reality systems by recognizing the potential of how experiential augmented reality can be when experiencing such content together by many at the same time. The AR platform provides for synchronized sharing of AR content in real time and across multiple AR-capable devices, thereby allowing multiple users to experience the same AR content rendering in real time and within a live, physical environment or space, wherein such rendering of AR content is adapted to each user's point of view. The synchronization of content allows for multiple users within the given space to more naturally interface with the shared AR content as well as observe an identical combination of digital and physical reality, thereby simultaneously experiencing and interacting with augmented reality environments. The AR platform allows for the display of AR content within the same physical location and orientation across multiple AR-capable devices, regardless of the devices being from identical or different manufactures. By combining different device types together, the system of the present invention is accessible by most device owners, providing similar AR experiences to both the handheld mobile market (i.e., smartphones or tablets) and the more expensive lightweight eyewear market. Additionally, by integrating and leveraging multiple technologies (i.e., image tracking technology, cloud-based anchor systems, local persistent anchoring systems, and re-localization proximity sensors), the system of the present invention is able to ensure constant re-localization that does not depend solely on a single technology. Based on the communication capabilities (e.g., network communications), reliability can be shared across the different platforms, thereby improving the overall AR experience for all users.

By providing a truly immersive and shared AR experience, systems of the present invention can be particularly beneficial in various industries that cater to, or otherwise rely on, multiple guests, participants, patrons, or the like. For example, the system of the present invention may be particularly useful in the entertainment industry in which a given venue provides entertainment to multiple guests at once, such as a zoo, theme park, sporting event, or the like. Similarly, the systems of the present invention may be useful for educational purposes (i.e., classroom environment in which the instructor and associated course lesson is provided to multiple students via an AR experience provided on each student's AR-capable device) or military exercises (i.e., soldiers can train via customized training scenarios provided via an AR experience, including multi-user combat situations).

BRIEF DESCRIPTION OF THE DRAWINGS

FIGS. 12-16 are images depicting an AR-based zoo experience for multiple guests within controlled spaces (i.e., specific "exhibits"), in which systems of the present invention provide synchronized sharing of zoo-based AR content (i.e., zoo-related animals) in real time and across multiple AR-capable devices (i.e., wearable headsets and/or personal computing devices, such as a smartphone or tablet).

FIG. 17 is an exemplary layout or map of an AR-based zoo experience, illustrating the various "exhibits".

FIG. 18 is an image depicting an AR-based classroom experience, in which the instructor and associated course content is provided to multiple students via an AR experience, wherein each student is wearing an AR-capable headset.

FIG. 19 is an image depicting another embodiment of an AR-based classroom experience, in which the instructor and associated course content/lesson is provided to multiple students via an AR experience, wherein each student is viewing and interacting with the course content/lesson and instructor via a tablet computing device, further illustrating the multiple point of views for each student, adding to the realism and feel. Such an experience is particularly useful for distance education, such as remote learning or the like.

FIG. 20 is an image depicting an AR-based military experience, in which multiple soldiers are provided with a military training scenario.

DETAILED DESCRIPTION

Figure 1:
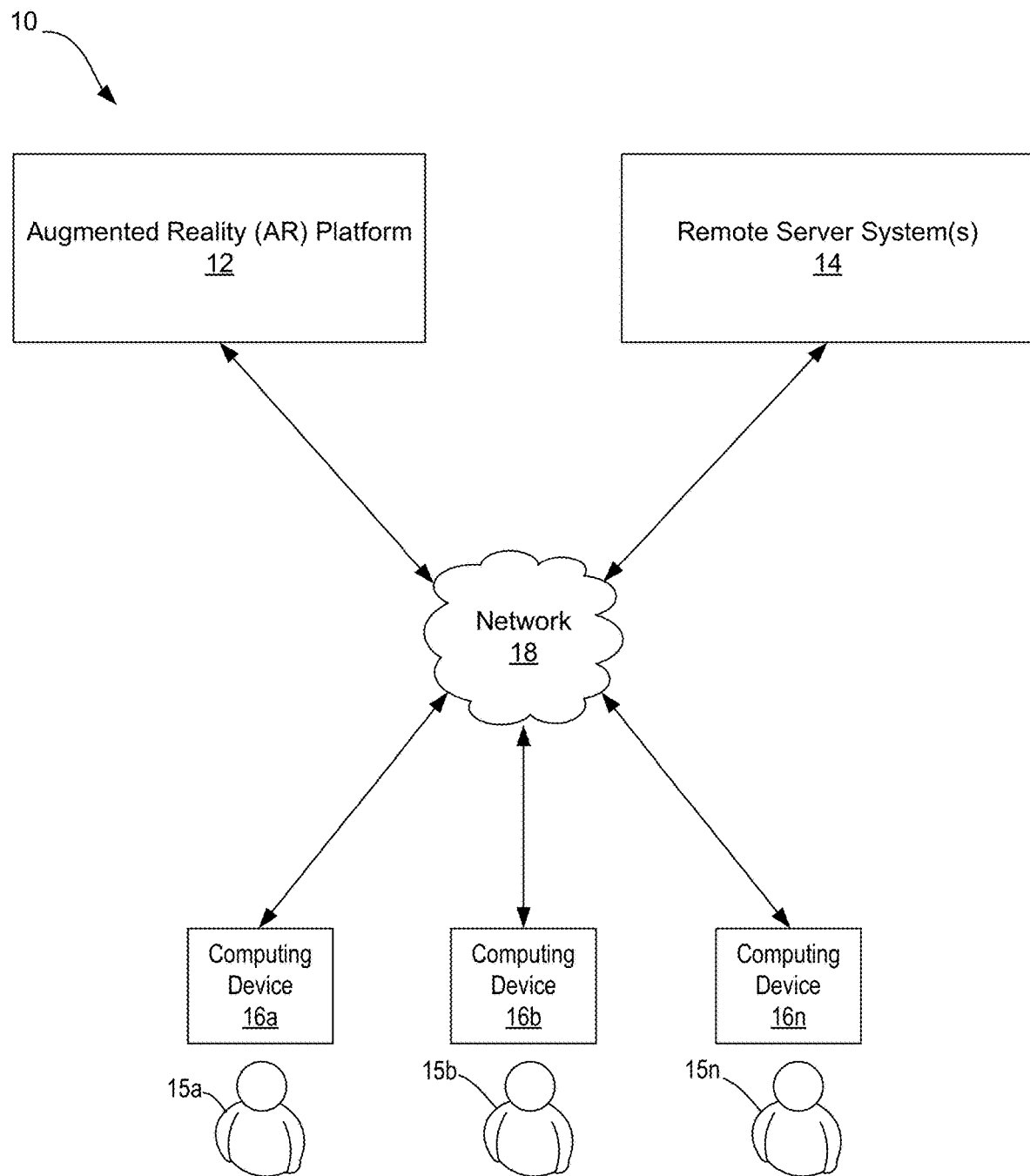
FIG. 1 is a block diagram illustrating one embodiment of an exemplary system for providing synchronized sharing of augmented reality content across multiple devices.

The present invention is directed to a system including an augmented reality (AR) platform providing synchronized sharing of AR content in real time and across multiple AR-capable devices within a controlled, physical environment or space. In particular, the system of the present invention includes a mesh network of technologies integrated with one another and used to ultimately establish alignment of digital content, including rendering thereof, against a physical environment or space. Such a system allows for multiple users to experience the same AR content rendering in real time and within a live, physical environment or space, wherein such rendering of AR content is adapted to each user's point of view.

The AR platform, for example, is accessible to users via associated AR-capable computing devices, including certain personal computing devices (i.e., smartphones and tablets) as well as AR-specific computing devices, including wearable headsets and eyewear, for example.

The system includes the use of a controlled, real-world environment or space. The given space is controlled, meaning the space itself and real-world objects and articles, and other components within said space, are controlled, such as control over the appearance of walls, flooring, ceiling, placement of objects, lighting, temperature, and sounds, and the like. In other words, many, if not all, aspects of the given space may be controlled to provide a specific environment in which to provide an AR experience in that given space to users (i.e., guests, patrons, participants, or the like). By controlling the space, the system of the present invention is able to provide a persistently shared experience dedicated to the specific space.

For any given controlled space, a shared point is initially established (also referred to herein as "world origin point" or "world origin"). Establishing a world origin point within the controlled space allows for the AR platform to place digital content relative to the world origin point for subsequent rendering across multiple AR-capable devices. The controlled space is digitally mapped, such that digital data associated with the controlled space, including the world-origin point coordinate data, is stored for subsequent retrieval and use during rendering of AR content.

In addition, the system further relies on image tracking for alignment purposes. For example, the physical space can be decorated using image marker technology. Use of image marker technology allows for canonically established images to represent coordinates associated with the world origin point. For example, at the start of a given AR session or experience, devices with image tracking technology can utilize one or more image trackers (i.e. physical markers) within a given space to localize into the space and align the AR session to the world origin point. The localized coordinates of each image marker along with a unique image marker identifier is stored for each image for subsequent retrieval and use by each device, thereby allowing devices to understand the space without requiring any individual device setup.

The AR platform further coordinates the world origin point of a given controlled space with anchor-based localization to thereby align the multiple devices. In particular, each device may be running an anchor-based software algorithm unique to that device's given platform. Each participating AR-capable device (i.e., AR-headset, smartphone, tablet, or other computing device that is AR-capable) within the controlled space essentially agrees upon the established world origin point, thereby allowing for digital content (e.g., images) to consistently appear in the same, real world location in the controlled space for each individual device as a result of one or more localization and subsequent re-localization processes for each device, as described in greater detail herein.

Upon a set of devices localizing into the controlled space using at least one of the image tracking and cloud anchoring techniques, the AR platform allows for dynamic, real-time localization across all devices in the given space. Each device will determine, through a series of checks, whether to start generating temporary cloud anchors for more accurately sharing an AR experience with new devices that enter the space. As image tracking can require positioning devices in close proximity to image markers, temporary cloud anchors provide an advantage of allowing more devices to arbitrarily localize into the space without having a multitude of viewers try to crowd into the same vantage point.

The system of the present invention further accounts for drift by providing for automatic and repeated localization (i.e., re-localization) for any device. One or more locations within a given controlled space may be designated as re-localization points, in which any given user's proximity may be detected via a proximity sensor, such as a near-field communication-based device. For example, proximity sensors may include Bluetooth Low-Energy (BLE) sensors. Upon being detected, a near-field communication-based sensor may communicate with the AR platform and/or device and subsequently initiate a re-localization process, in which the device will automatically attempt to re-localize (requiring no direct input or interaction from the user). Accordingly, the system of the present invention provides for continuous re-alignment of the dynamic world origin point through a combination of the use of the physical image markers as well as disparate cloud services of each device to maintain the associated coordinates consistently across device software systems throughout the duration of each AR session/experience.

Accordingly, the system of the present invention addresses the drawbacks of current augmented reality systems by recognizing the potential of how experiential augmented reality can be when experiencing such content together by many at the same time. The AR platform provides for synchronized sharing of AR content in real time and across multiple AR-capable devices, thereby allowing multiple users to experience the same AR content rendering in real time and within a live, physical environment or space, wherein such rendering of AR content is adapted to each user's point of view. The synchronization of content allows for multiple users within the given space to more naturally interface with the shared AR content as well as observe an identical combination of digital and physical reality, thereby simultaneously experiencing and interacting with augmented reality environments. The AR platform allows for the display of AR content within the same physical location and orientation across multiple AR-capable devices, regardless of the devices being from identical or different manufactures. By combining different device types together, the system of the present invention is accessible by most device owners, providing similar AR experiences to both the handheld mobile market (i.e., smartphones or tablets) and the more expensive lightweight eyewear market. Additionally, by integrating and leveraging multiple technologies (i.e., image tracking technology, cloud-based anchor systems, local persistent anchoring systems, and re-localization proximity sensors), the system of the present invention is able to ensure constant re-localization that does not depend solely on a single technology. Based on the communication capabilities (e.g., network communications), reliability can be shared across the different platforms, thereby improving the overall AR experience for all users.

For the sake of clarity and ease of description, the systems described herein and AR experiences provided by such systems may be implemented in an indoor environment, such as within a room or multiple rooms within a building or enclosed space, such as an indoor attraction. More specifically, the following embodiments describe the use of multiple controlled spaces that are part of an overall AR experience to be provided to the users (i.e., multiple rooms or spaces at a particular venue, such as a multiple spaces representing multiple exhibits at an AR-based zoo). However, it should be noted that systems of the present invention may be used to provide AR experiences in outdoor environments (i.e., such as military training or outdoor entertainment venues and attractions).

FIG. 1 illustrates one embodiment of an exemplary system 10 consistent with the present disclosure. As shown, system 10 includes an augmented reality (AR) platform 12. The AR platform 12 may be embodied on an internet-based computing system/service. For example, the AR platform 12 may be embodied on a cloud-based service, for example. The AR platform 12 is configured to communicate and share data with one or more users 15(a)-15(n) via computing devices 16(a)-16(n) over a network 18, for example. The system 10 further includes one or more remote server systems 14, which may be associated with one or more backend platforms or systems for one or more of the computing devices 16. For example, as will be described in greater detail herein, each of the computing devices may run platform-specific anchor-based localization processes, including, but not limited to, cloud anchoring processes, such as Apple's ARKit, Google's ARCore, or Microsoft's Hololens & Azure systems. Accordingly, the remote server systems 14 may be associated with such platform-specific anchor-based localization processes.

In the present context, depending on the specific AR experience to be provided and the particular use of the system, the users may include guests, patrons, participants, students, or the like. For example, in one example, the system of the present invention may be particularly useful in the entertainment industry in which a given venue provides entertainment to multiple guests or patrons at once, such as a zoo, theme park, sporting event, or the like. Similarly, the systems of the present invention may be useful for educational purposes (i.e., classroom environment in which the instructor and associated course lesson is provided to multiple students via an AR experience provided on each student's AR-capable device) or military and/or law enforcement exercises (i.e., soldiers, military personnel, police officers, etc.) can train via customized training scenarios provided via an AR experience, including multi-user combat situations).

The network 18 may represent, for example, a private or non-private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the computing devices 16, and/or between the computing devices 16 and AR platform 12, and/or between the computing devices 16 and remote server system(s) 14, and/or between the AR platform 12 and remote server system(s) 14, may be, in whole or in part, a wired connection.

The network 18 may be any network that carries data. Non-limiting examples of suitable networks that may be used as network 18 include Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G), fifth-generation (5G) cellular-based data communication technologies, Bluetooth radio, Near Field Communication (NFC), the most recently published versions of IEEE 802.11 transmission protocol standards, other networks capable of carrying data, and combinations thereof. In some embodiments, network 18 is chosen from the internet, at least one wireless network, at least one cellular telephone network, and combinations thereof. As such, the network 18 may include any number of additional devices, such as additional computers, routers, and switches, to facilitate communications. In some embodiments, the network 18 may be or include a single network, and in other embodiments the network 18 may be or include a collection of networks.

The AR platform 12 is configured to communicate and share data with the computing devices 16 associated with one or more users 15 as well as the remote server system(s). Accordingly, the computing device 16 may be embodied as any type of device for communicating with the AR platform 12 and remote server system(s) 14, and/or other user devices over the network 18. For example, at least one of the user devices may be embodied as, without limitation, any form of computing device capable of rendering the intended AR experience provided, in part, via the AR platform 12, such as a smartphone or tablet, which include camera hardware and associated display for providing a view of the real-world environment (via a viewfinder on the display when a camera is capturing a live view of the real-world environment) and further rendering digital content provided by the AR platform 12 overlaying the real-world environment. In addition to the use of smartphones and/or tablets, the user devices 16 may include AR-capable wearable headsets, such as, for example, Microsoft® Hololens®, or other augmented reality and/or mixed reality headsets.

The AR platform 12 includes a mesh network of technologies integrated with one another and used to ultimately establish alignment of digital AR content, including rendering thereof, against the controlled physical environment or space. The AR platform 12 ultimately allows for multiple users to experience the same AR content rendering in real time, wherein such rendering of AR content is adapted to each user's point of view within the controlled, real-world space, as will be described in greater detail herein.

It should be noted that embodiments of the system 10 of the present disclosure include computer systems, computer operated methods, computer products, systems including computer-readable memory, systems including a processor and a tangible, non-transitory memory configured to communicate with the processor, the tangible, non-transitory memory having stored instructions that, in response to execution by the processor, cause the system to perform steps in accordance with the disclosed principles, systems including non-transitory computer-readable storage medium configured to store instructions that when executed cause a processor to follow a process in accordance with the disclosed principles, etc.

Figure 2:
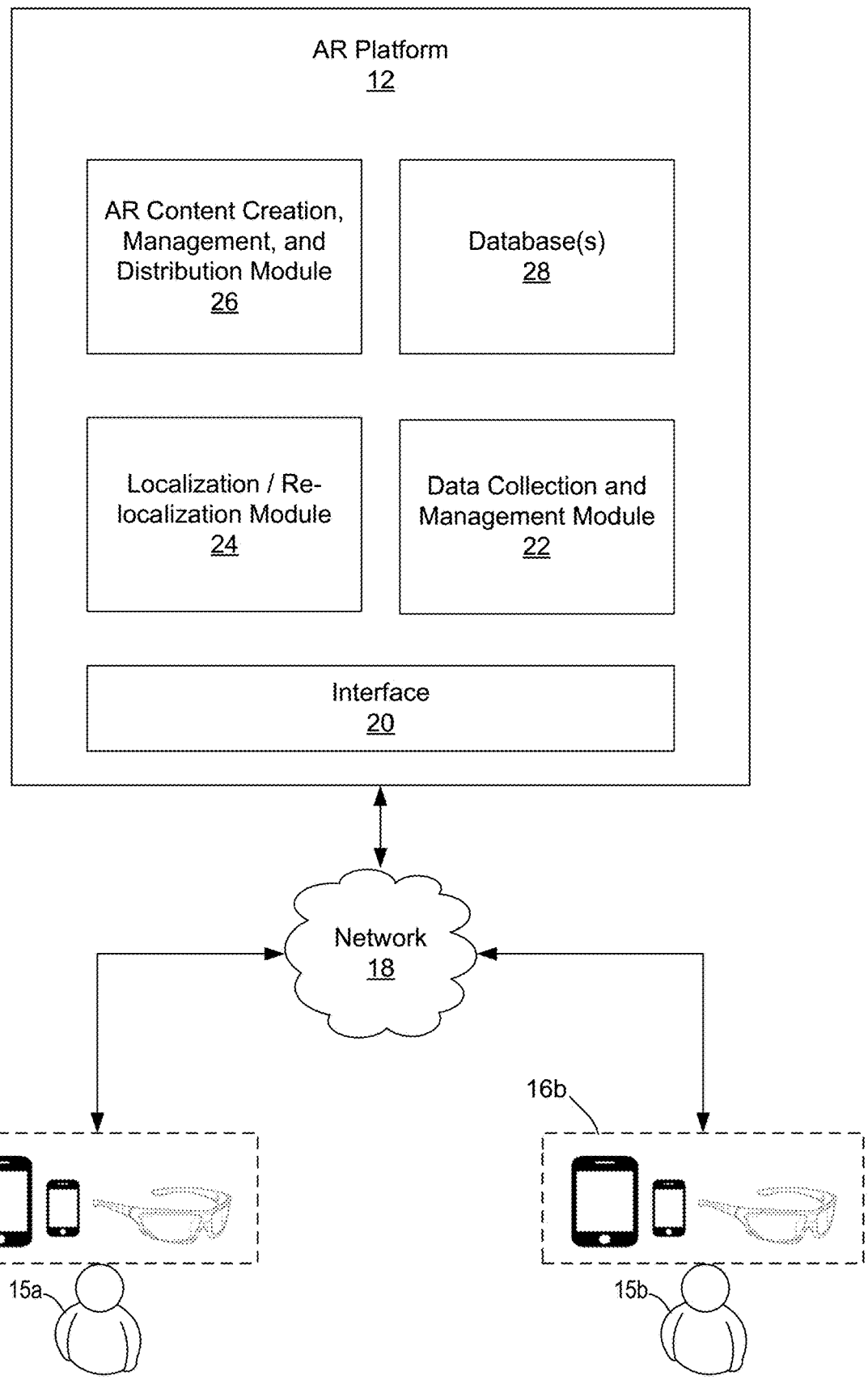
FIG. 2 is a block diagram illustrating the augmented reality (AR) platform of FIG. 1 in greater detail.

FIG. 2 is a block diagram illustrating the augmented reality (AR) platform 12 in greater detail. As shown, the AR platform 12 may include an interface 20, a data collection and management module 22, a localization/re-localization module 24, an AR content creation, management, and distribution module 26, and various databases 28 for storage of data. As will be described in greater detail herein, the AR platform 12 is configured to communicate and share data with one or more users 15(*a*)-15(*n*) via computing devices 16(*a*)-16(*n*) over a network 18, for example.

Figure 3:
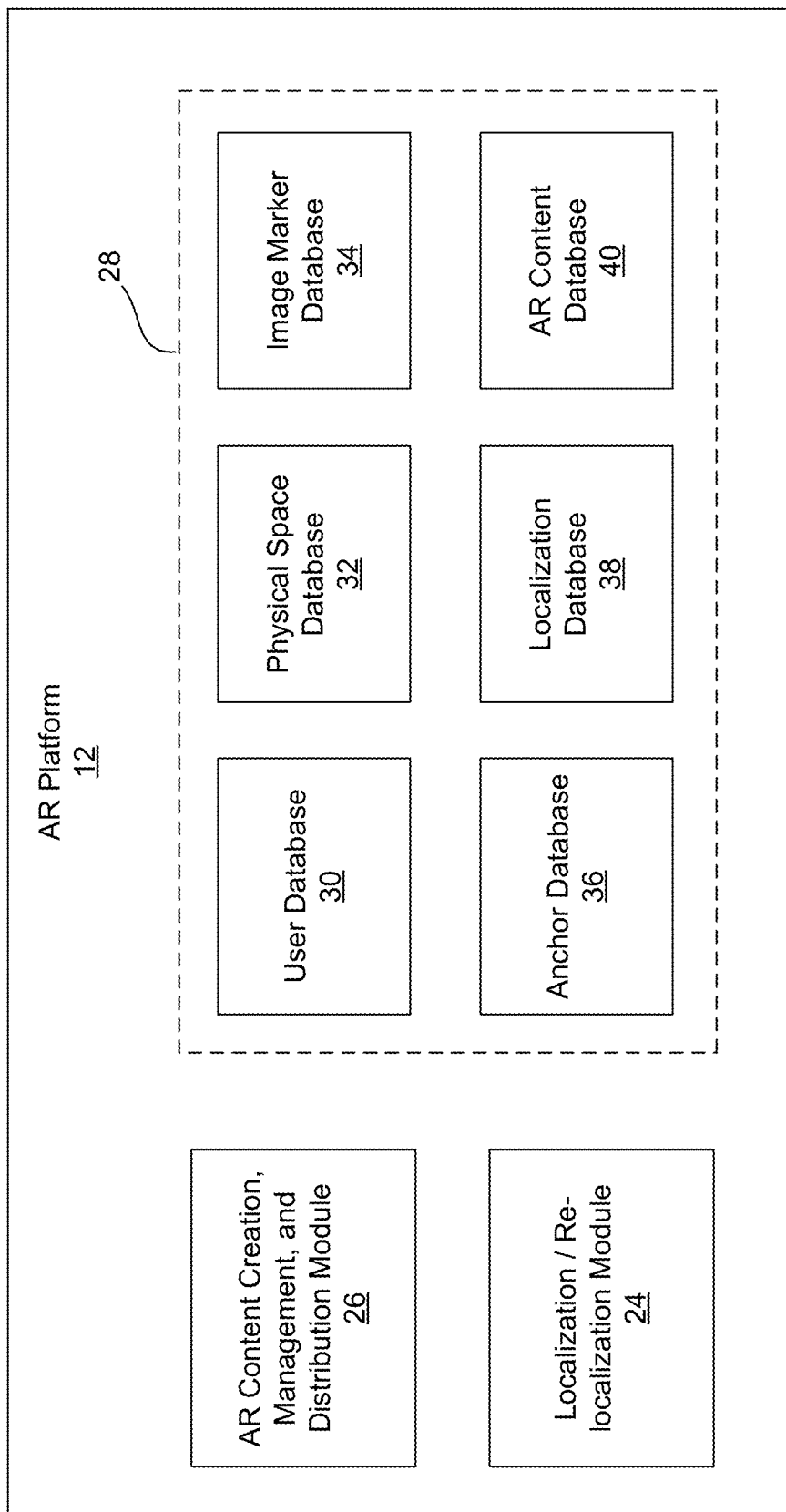
FIG. 3 is a block diagram illustrating the various databases in greater detail.

FIG. 3 is a block diagram illustrating the various databases in greater detail. In particular, the various databases for storage of data include, but are not limited to, a user database 30 for storing profiles of users and their associated devices, for example, a physical space database 32 for storing data associated with controlled physical spaces for one or more associated AR experiences, an image marker database 34 for storing image marker data associated with one or more controlled physical spaces, an anchor database 36 for storing anchor data of a given device 16 during an AR experience, a localization/re-localization database 38 for storing localization (and re-localization) data of a given device 16 during an AR experience, and an AR content database 40 for storing AR content (i.e., digital images or other media) to be transmitted to the devices 16 as part of an AR experience of a given controlled space, such as images including one or more objects, composed by the AR platform 12 or provided thereto from an external source, to be displayed as overlays on views of the controlled, real-world space via the device 16. The data collection and management module 22 may be configured to communicate and exchange data with each of the databases, as well as the other modules provided.

The interface 20 may generally allow a user to gain access to one or more features of the AR services, which may include an interactive interface in which users may select certain inputs may adjust, or otherwise result in interaction with, a given AR experience. The interface 20 may also provide general information regarding the AR experience (i.e., guidance in the form of a map or layout providing directions to the next exhibit or previous exhibit, requests prompting the user to take certain actions, such as actively initiating a localization process, alerts indicating to the user that certain AR experiences are available and or ready, etc.).

Figure 4:
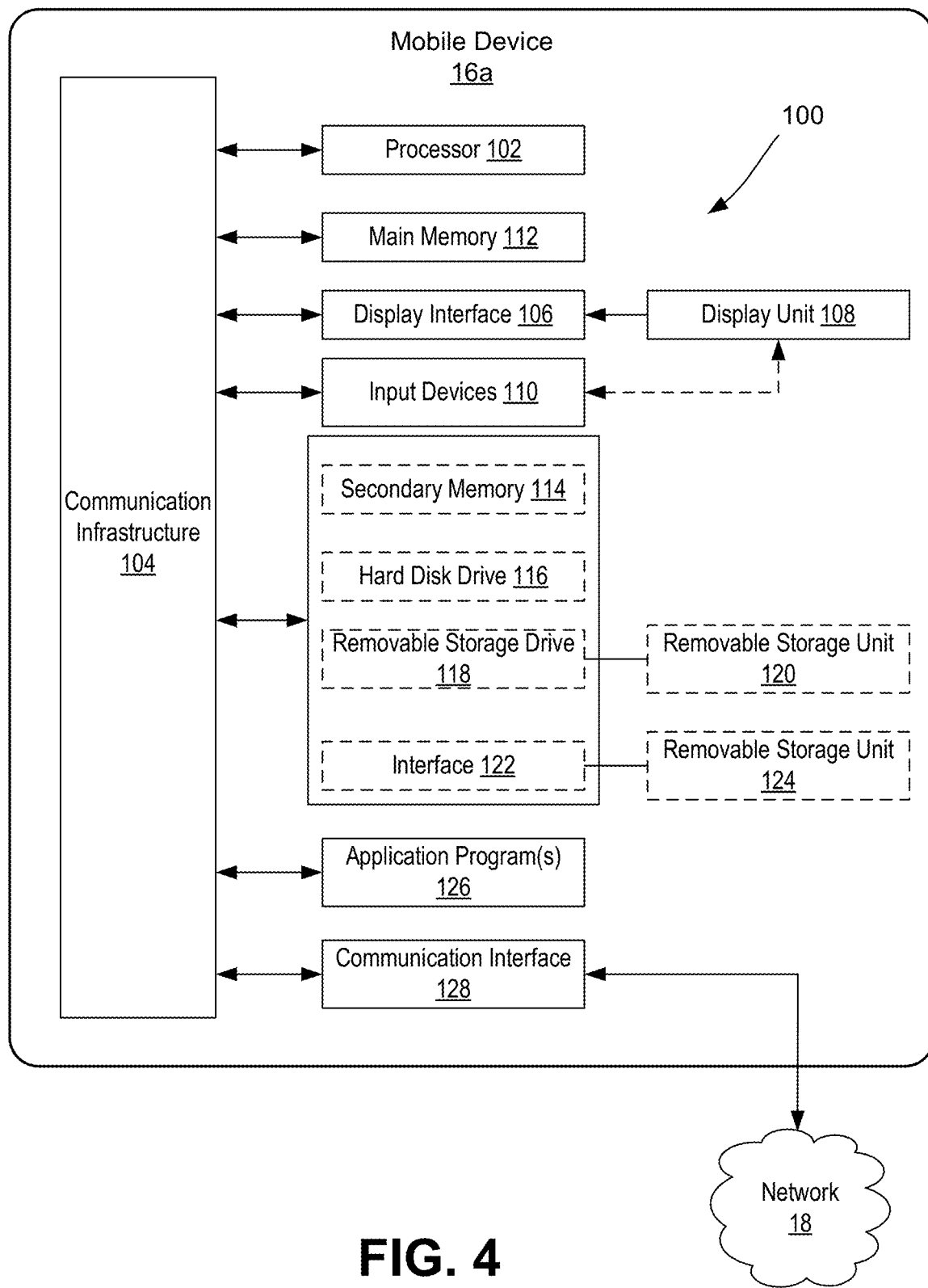
FIG. 4 is a block diagram illustrating at least one embodiment of a computing device (i.e., smartphone or tablet) for communicating with the AR platform and for subsequently conveying an AR experience to an associated user based on communication with at least the AR platform.

FIG. 4 is a block diagram illustrating at least one embodiment of a computing device (i.e., smartphone or tablet) 16*a* for communicating with the AR platform 12 and remote server system(s) 14 and for subsequently conveying an AR experience to an associated user 15 based on communication with at least the AR platform 12. The mobile device 16 generally includes a computing system 100. As shown, the computing system 100 includes one or more processors, such as processor 102. Processor 102 is operably connected to communication infrastructure 304 (e.g., a communications bus, cross-over bar, or network). The processor 102 may be embodied as any type of processor capable of performing the functions described herein. For example, the processor may be embodied as a single or multi-core processor(s), digital signal processor, microcontroller, or other processor or processing/controlling circuit.

The computing system 100 further includes a display interface 106 that forwards graphics, text, sounds, and other data from communication infrastructure 104 (or from a frame buffer not shown) for display on display unit 108. The computing system further includes input devices 110. The input devices 110 may include one or more devices for interacting with the mobile device 16, such as a keypad, microphone, camera, as well as other input components, including motion sensors, and the like. For example, the mobile device 16 may include any variety of sensors for capturing data related to at least one of a location of the user within the controlled, physical space, a point of gaze of the user within the given space, a field of view of the user within the given space, as well as a physical setting and objects within the given space. The sensors may include one or more of a camera, motion sensor, and global positioning satellite (GPS) sensor. The motion sensor may be embodied as any type of sensor configured to capture motion data and produce sensory signals. For example, the motion sensor may be configured to capture data corresponding to the movement of the device or lack thereof. The motion sensor may include, for example, an accelerometer, an altimeter, one or more gyroscopes, or other motion or movement sensor to produce sensory signals corresponding to motion or movement of the device 16 and/or a magnetometer to produce sensory signals from which direction of travel or orientation can be determined. The one or more motion sensors may further include, or be coupled to, an inertial measurement unit (IMU) module for example.

The motion sensors may also be embodied as a combination of sensors, each of which is configured to capture a specific characteristic of the motion of the device 16, or a specific characteristic of user movement. A motion sensor embodied as a combination of sensors may use algorithms, such as, for example, fusion algorithms, to correct and compensate the data from individual sensors and provide more robust motion sensing and detection context than each individual sensor can provide alone.

In one embodiment, the display unit 108 may include a touch-sensitive display (also known as "touch screens" or "touchscreens"), in addition to, or as an alternative to, physical push-button keyboard or the like. The touch screen may generally display graphics and text, as well as provides a user interface (e.g., but not limited to graphical user interface (GUI)) through which a user may interact with the mobile device 16, such as accessing and interacting with applications executed on the device 16, including an app for communicating and exchanging data with the AR platform 12, as well as rendering digital AR content provided by the AR platform 12.

The computing system 100 further includes main memory 112, such as random access memory (RAM), and may also include secondary memory 114. The main memory 112 and secondary memory 114 may be embodied as any type of device or devices configured for short-term or long-term storage of data such as, for example, memory devices and circuits, memory cards, hard disk drives, solid-state drives, or other data storage devices. Similarly, the memory 112, 114 may be embodied as any type of volatile or non-volatile memory or data storage capable of performing the functions described herein.

In the illustrative embodiment, the mobile device 16 may maintain one or more application programs, databases, media and/or other information in the main and/or secondary memory 112, 114. The secondary memory 114 may include, for example, a hard disk drive 116 and/or removable storage drive 118, representing a floppy disk drive, a magnetic tape drive, an optical disk drive, etc. Removable storage drive 118 reads from and/or writes to removable storage unit 120 in any known manner. The removable storage unit 120 may represent a floppy disk, magnetic tape, optical disk, etc. which is read by and written to by removable storage drive 118. As will be appreciated, removable storage unit 120 includes a computer usable storage medium having stored therein computer software and/or data.

In alternative embodiments, the secondary memory 114 may include other similar devices for allowing computer programs or other instructions to be loaded into the computing system 100. Such devices may include, for example, a removable storage unit 124 and interface 122. Examples of such may include a program cartridge and cartridge interface (such as that found in video game devices), a removable memory chip (such as an erasable programmable read only memory (EPROM), or programmable read only memory (PROM)) and associated socket, and other removable storage units 124 and interfaces 122, which allow software and data to be transferred from removable storage unit 124 to the computing system 100.

The computing system 100 further includes one or more application programs 126 directly stored thereon. The application program(s) 126 may include any number of different software application programs, each configured to execute a specific task.

The computing system 100 further includes a communications interface 128. The communications interface 128 may be embodied as any communication circuit, device, or collection thereof, capable of enabling communications between the mobile device 16 external devices (other mobile devices 16, the AR platform 12 and/or remote server system(s) 14). The communications interface 128 may be configured to use any one or more communication technology and associated protocols, as described above, to effect such communication. For example, the communications interface 128 may be configured to communicate and exchange data with the digital content management platform 12, and/or one other mobile device 16, via a wireless transmission protocol including, but not limited to, Bluetooth communication, infrared communication, near field communication (NFC), radio-frequency identification (RFID) communication, cellular network communication, the most recently published versions of IEEE 802.11 transmission protocol standards, and a combination thereof. Examples of communications interface 128 may include a modem, a network interface (such as an Ethernet card), a communications port, a Personal Computer Memory Card International Association (PCMCIA) slot and card, wireless communication circuitry, etc.

Computer programs (also referred to as computer control logic) may be stored in main memory 112 and/or secondary memory 114 or a local database on the mobile device 16. Computer programs may also be received via communications interface 128. Such computer programs, when executed, enable the computing system 100 to perform the features of the present invention, as discussed herein. In particular, the computer programs, including application programs 126, when executed, enable processor 102 to perform the features of the present invention. Accordingly, such computer programs represent controllers of computer system 100.

In one embodiment where the invention is implemented using software, the software may be stored in a computer program product and loaded into the computing system 100 using removable storage drive 118, hard drive 116 or communications interface 128. The control logic (software), when executed by processor 102, causes processor 102 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 5:
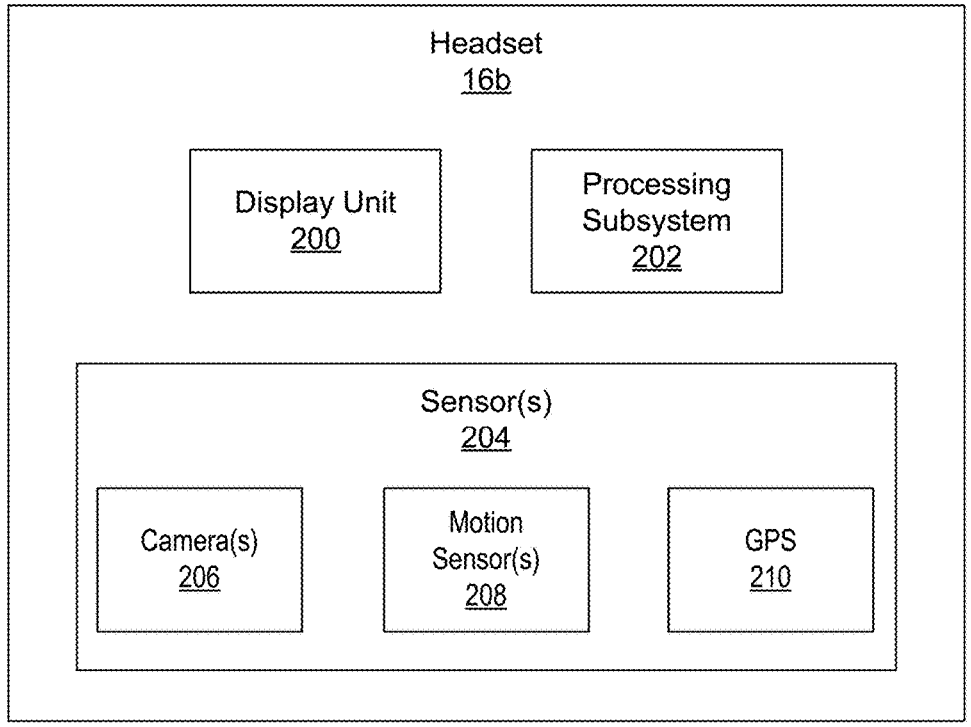
FIG. 5 is a block diagram illustrating at least one embodiment of a computing device (i.e., wearable headset) for communicating with the AR platform and for subsequently conveying an AR experience to an associated user based on communication with at least the AR platform.

FIG. 5 is a block diagram illustrating at least one embodiment of a computing device (i.e., wearable headset) 16b for communicating with the AR platform 12 and for subsequently conveying an AR experience to an associated user 15 based on communication with at least the AR platform 12. The headset 16b includes a display unit 200 positioned to be within a field of view of a person wearing the headset (i.e., the "wearer") and a processing subsystem 202 built into the headset 16b and configured to communicate with the AR platform 12 and remote server system(s) 14 to exchange various sensor data to be used for at least one of localization, re-localization, and eventual receipt of augmented reality (AR) content to be displayed on the display unit 100. The processing subsystem 202 includes, for example, a hardware processor coupled to non-transitory, computer-readable memory containing instructions executable by the processor to cause the processing subsystem 200 to communicate with the AR platform 12 and remote server system(s) 14 over the network 18 and exchange data therewith.

As shown, the headset 16b may include a variety of sensors 204 for capturing data related to at least one of a location of the wearer within the controlled, physical space, a point of gaze of the wearer within the physical space, a field of view of the wearer within the physical space, and a physical setting and objects within the space. The sensors 204 may include one or more of a camera 206, motion sensor 208, and global positioning satellite (GPS) sensor 210.

The camera 206 is operable to capture one or more images (or a series of images) of the given, controlled space in which the AR experience is taking place. The motion sensor 208 may include an accelerometer, an altimeter, one or more gyroscopes, other motion or movement sensors to produce sensory signals corresponding to motion or movement of the headset 16b and the wearer, and a magnetometer to produce sensory signals from which direction of travel or orientation of the headset 16b (i.e., the orientation of the wearer) can be determined.

The motion sensor 208, for example, may be embodied as any type of sensor configured to capture motion data and produce sensory signals. For example, the motion sensor may be configured to capture data corresponding to the movement of the device or lack thereof. The motion sensor may include, for example, an accelerometer, an altimeter, one or more gyroscopes, or other motion or movement sensor to produce sensory signals corresponding to motion or movement of the headset 16b and/or a magnetometer to produce sensory signals from which direction of travel or orientation can be determined. The one or more motion sensors may further include, or be coupled to, an inertial measurement unit (IMU) module for example.

The motion sensors may also be embodied as a combination of sensors, each of which is configured to capture a specific characteristic of the motion of the headset 16b, or a specific characteristic of user movement. A motion sensor embodied as a combination of sensors may use algorithms, such as, for example, fusion algorithms, to correct and compensate the data from individual sensors and provide more robust motion sensing and detection context than each individual sensor can provide alone.

Figure 6:
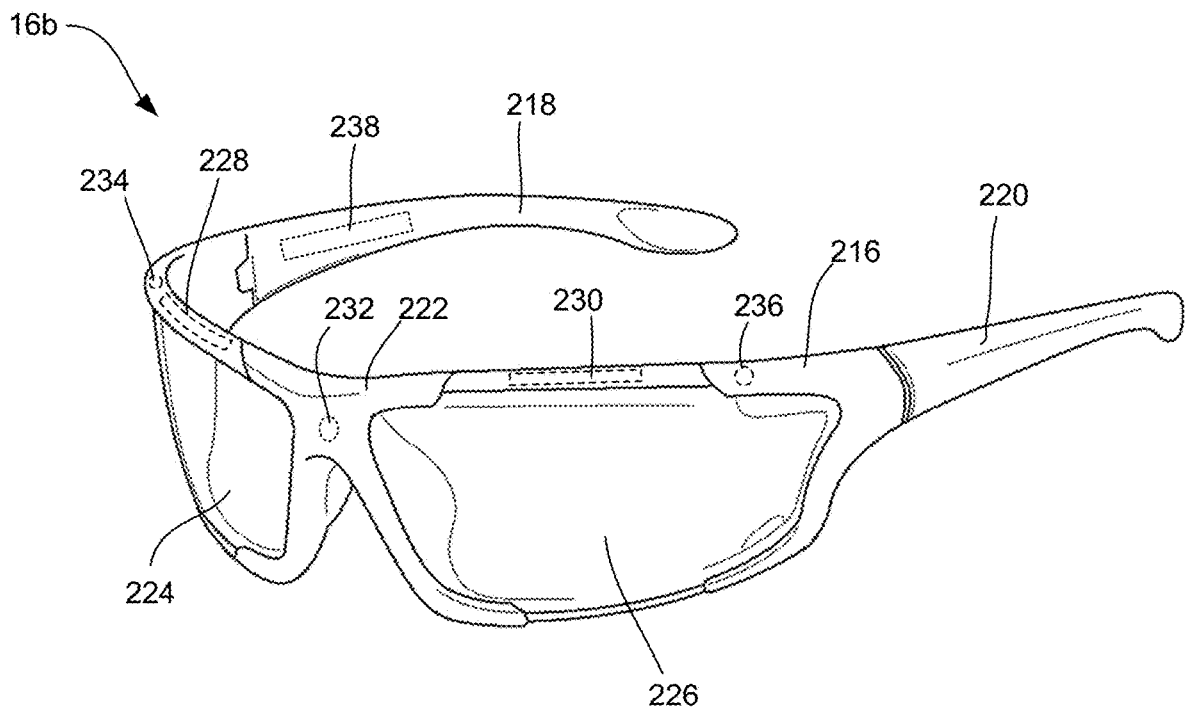
FIG. 6 shows a perspective view of an exemplary wearable headset of the system of the present invention.

FIG. 6 shows a perspective view of an exemplary wearable headset 16b of the system of the present invention. As illustrated, the headset 16b is generally in form of a pair of eyewear. The headset 16b includes a frame member 216 including a right earpiece 218 and a left earpiece 220, which may be fixedly or hingedly attached to the frame member 216. The frame member 216 further includes a center bridge 222. The headset 16b includes a first lens 224 (e.g., as a right lens) and also includes a second lens 226 (e.g., as a left lens) to provide binocular vision. The right lens 224 and left lens 226 are mounted to the frame member 216. The headset 16b may be dimensioned to be worn on a human head, with each earpiece extending over a respective ear such that a portion of the frame member 216 extends across the human face. The right lens 224 and left lens 226 may be mounted to the frame member 216 such that, when the headset 16b is worn, each of the right lens and left lens 224, 226 is disposed in front of a the respective eyes of the wearer. As previously described, the headset 16b may include one or more sensors 232, 234, 236, and 238, such as camera(s), microphone(s), motion sensor(s), GPS sensor(s), and the like, for capturing/sensing data associated with the location, orientation, or field-of-view information of the person wearing the headset 16b to compose the augmented reality content in real-time.

Furthermore, in certain embodiments, the headset 16b includes one or more of electronic displays or projectors 228, 230 for each of the right lens and left lens 224, 226, as previously described herein.

Figure 7:
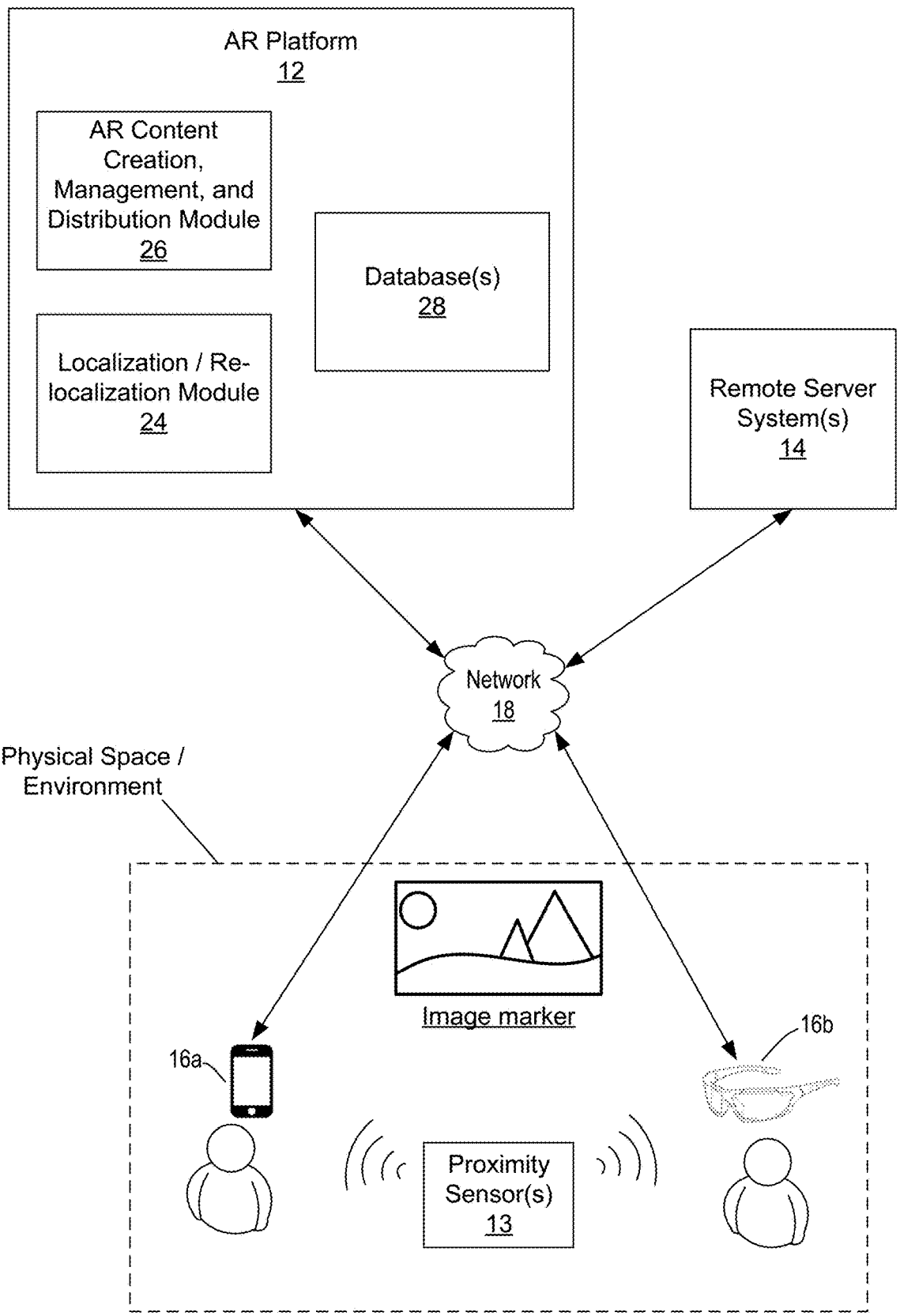
FIG. 7 is a block diagram illustrating communication between multiple AR-capable devices and the AR platform for localization and re-localization thereof based on at least one of image tracking technology, anchor-based technology, and proximity sensing.

FIG. 7 is a block diagram illustrating communication between multiple AR-capable devices 16a and 16b and the AR platform 12 for localization and re-localization thereof based on at least one of image tracking technology, anchor-based technology, and proximity sensing.

As previously described, the system 12 includes the use of a physical, real-world environment, preferably a controlled space (i.e., a room or at least partially enclosed space) in which the AR content is to be presented to the multiple users (via each user's AR-capable device). The use of a controlled space allows for the system of the present invention to provide a persistently shared experience dedicated to the specific space. In some embodiments, the environment may include multiple controlled spaces that are part of an overall AR experience to be provided to the users (i.e., multiple rooms or spaces at a particular venue, such as a multiple spaces representing multiple exhibits at an AR-based zoo).

For any given controlled space, a shared point is initially established (also referred to herein as "world origin point" or "world origin"). The world origin point is generally defined as a specific position and orientation within the given space, which may be based on coordinate data (e.g., a coordinate axis system, including an x,y,z position and x,y,z orientation). Once established, all digital content will be subsequently placed relative to that world origin point. In layman's terms, the world origin point on a canonical world map would be the latitude and longitude of (0,0) with an orientation of north pointing to the north pole. All location coordinates specified with latitude and longitude values can be reasonably understood by any map program that respects this world origin point, with the latitude and longitude coordinates considered as being relative to that known world origin point.

Establishing a world origin point within the controlled space allows for the AR platform 12 to place digital content relative to the world origin point for subsequent rendering across multiple AR-capable devices. The controlled space is digitally mapped, such that digital data associated with the controlled space, including the world-origin point coordinate data, is stored within the physical space database 32, for example, for subsequent retrieval and use during rendering of AR content.

The system 10 further relies on image tracking for alignment purposes. For example, the physical space can be decorated using image marker technology. Use of image marker technology allows for canonically established images to represent coordinates associated with the world origin point. For example, at the start of a given AR session or experience, devices with image tracking technology can utilize one or more image trackers (i.e. physical markers) within a given space to localize into the space and align the AR session to the world origin point. The localized coordinates of each image marker along with a unique image marker identifier data is stored for each image within the image marked database 34, for example, for subsequent retrieval and use by each device 16, thereby allowing devices to understand the space without requiring any individual device setup.

The AR platform 12 further coordinates the world origin point of a given controlled space with anchor-based localization to thereby align the multiple devices. In particular, each device 16 may be running an anchor-based software algorithm unique to that device's given platform. Anchors are understood to include generated locations that represent a physical location of the associated device in the real world and stored as serialized data (e.g., in the form of coordinate data), and may be stored within the anchor database 36, for example. In some embodiments, the devices 16 may be running respective cloud anchoring systems. Additionally, some devices 16 may be running respective persistent anchoring systems. Accordingly, each of the devices 16 may run platform-specific anchor-based localization processes, including, but not limited to, cloud anchoring processes, such as Apple's ARKit, Google's ARCore, or Microsoft's Hololens & Azure systems.

As an anchor represents a physical point in the real world, anchors use localization to identify their relative location to world origin coordinates for each individual AR session, and thus those coordinates will vary with each session while their location and orientation would be identical across sessions (with a small margin of error depending on platform accuracy). Each participating device 16 within the controlled space essentially agrees upon the established world origin point, thereby allowing for digital content (e.g., images) to consistently appear in the same, real world location in the controlled space for each individual device as a result of one or more localization and subsequent re-localization processes for each device 16.

For each cloud anchoring system, for example, anchors will be established for each integrated platform in a similar manner to image markers. However, in the present system, cloud anchors are established using a computer vision-based mesh understanding of the physical world. As previously described, each device within the controlled space essentially agrees upon the established world origin point, such that each device localizes into the space based, at least in part, on established anchors for that device (i.e., correlation of anchor data with world origin point data).

Upon the devices 16 localizing into the controlled space using at least one of the image tracking and cloud anchoring techniques, the AR platform 12 allows for dynamic, real-time localization across all devices in the given space, as carried out via the localization/re-localization module 24 in some instances. In some embodiments, each device 16 will determine, through a series of checks, whether to start generating temporary cloud anchors for more accurately sharing an AR experience with new devices that enter the space. As image tracking can require positioning devices in close proximity to image markers, temporary cloud anchors provide an advantage of allowing more devices to arbitrarily localize into the space without having a multitude of viewers try to crowd into the same vantage point.

The system 10 further accounts for drift. For example, devices may be continuously re-localizing into the real world through a series of sensors, which may include an RGB camera, Lidar sensors, inertial measurement unit (IMU), motion sensors, infrared, or other tracking system. Such sensors are all subject to disruption, which can interfere with the device's understanding of its position and orientation in the real world environment. Accordingly, as a result of such disruption, the digital AR content provided may shift from its originally localized world origin, resulting in a phenomenon known as drift, which can cause digitally placed objects to shift to incorrect locations as a result.

To counter the effects of drift and to make the system easy to use for each user, the system of the present invention provides for automatic and repeated localization (i.e., re-localization) for any device. In particular, for a given AR experience that may include multiple controlled spaces (e.g., multiple exhibits in an AR-based zoo, for example), multiple locations within the real world environment may be designated as re-localization points, in which any given user's proximity may be detected via a proximity sensor, such as a near-field communication-based device. For example, proximity sensors may include Bluetooth Low-Energy (BLE) sensors 13. Upon being detected, a near-field communication-based sensor may communicate with the AR platform 12 and/or device 16 and subsequently initiate a re-localization process, in which the device 16 will automatically attempt to re-localize (requiring no direct input or interaction from the user), wherein re-localization data can be stored within the localization/re-localization database 38. Such re-localization points can be placed throughout a given AR experience at regular intervals that users (i.e., guests or participants) must necessarily pass through and are encouraged to come closer as part of the attraction(s). Accordingly, the system 10 of the present invention provides for continuous re-alignment of the dynamic world origin point through a combination of the use of the physical image markers as well as disparate cloud services of each device to maintain the associated coordinates consistently across device software systems throughout the duration of each AR session/experience.

As previously described, each device 16 transmits data, including sensor data and images or other information related to the user, to the AR platform 12. In turn, the AR platform 12 processes the data (via the AR content creation, management, and distribution module 26) in accordance with AR-based processes and in accordance with AR software, such as AutoCad3D, StudioMax or Cinema4D programs. The AR processing may be recognition-based augmented reality or location-based augmented reality, or a combination of both, as generally understood. The AR platform 12 may then obtain and/or create AR content, which may be in the form of one or more images including one or more objects, to be displayed as overlays on views of the physical, real-world space. In particular, platform 12 may use the location, orientation, or field-of-view information of the user, as well as other data associated with the device 16 (image marked data, anchor data, localization (re-localization) data, etc.) to compose the AR content in real, or near-real, time. Accordingly, the sensor data is important and is relied upon by the platform 12, which is able to generate and reposition AR content according to a location of the user (and associated device) within the physical space, as well as a position of the wearer's head with regards to objects within the given space. The devices effectively immerse the user in the augmented reality experience, because elements of the augmented reality scene are updated and received on-the-fly.

Figure 8:
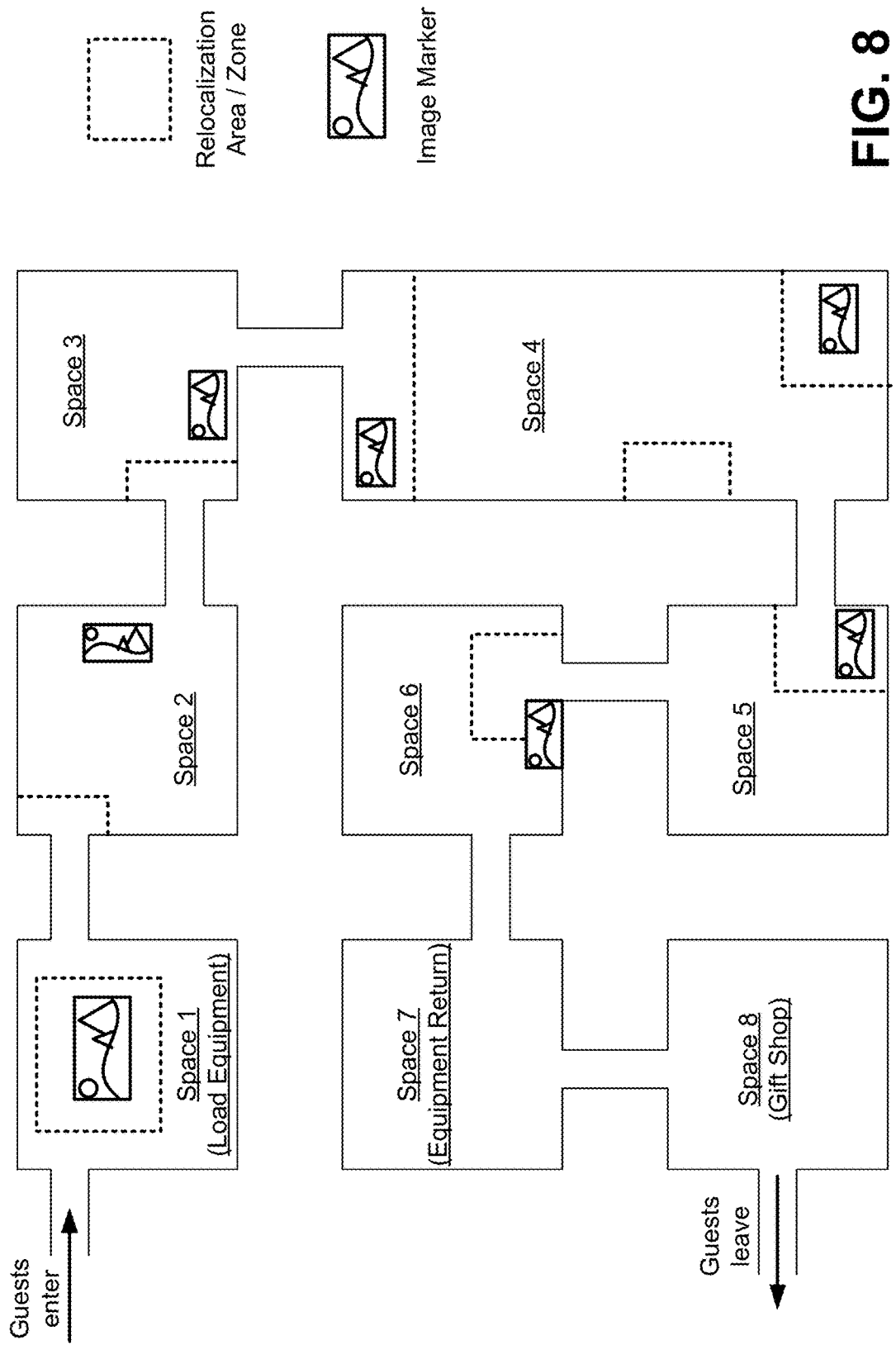
FIG. 8 is an exemplary layout of a venue comprised of multiple controlled spaces, each having an established world origin point for a given attraction, at least one image tracking marker, and re-localization zones.
Figure 9A:
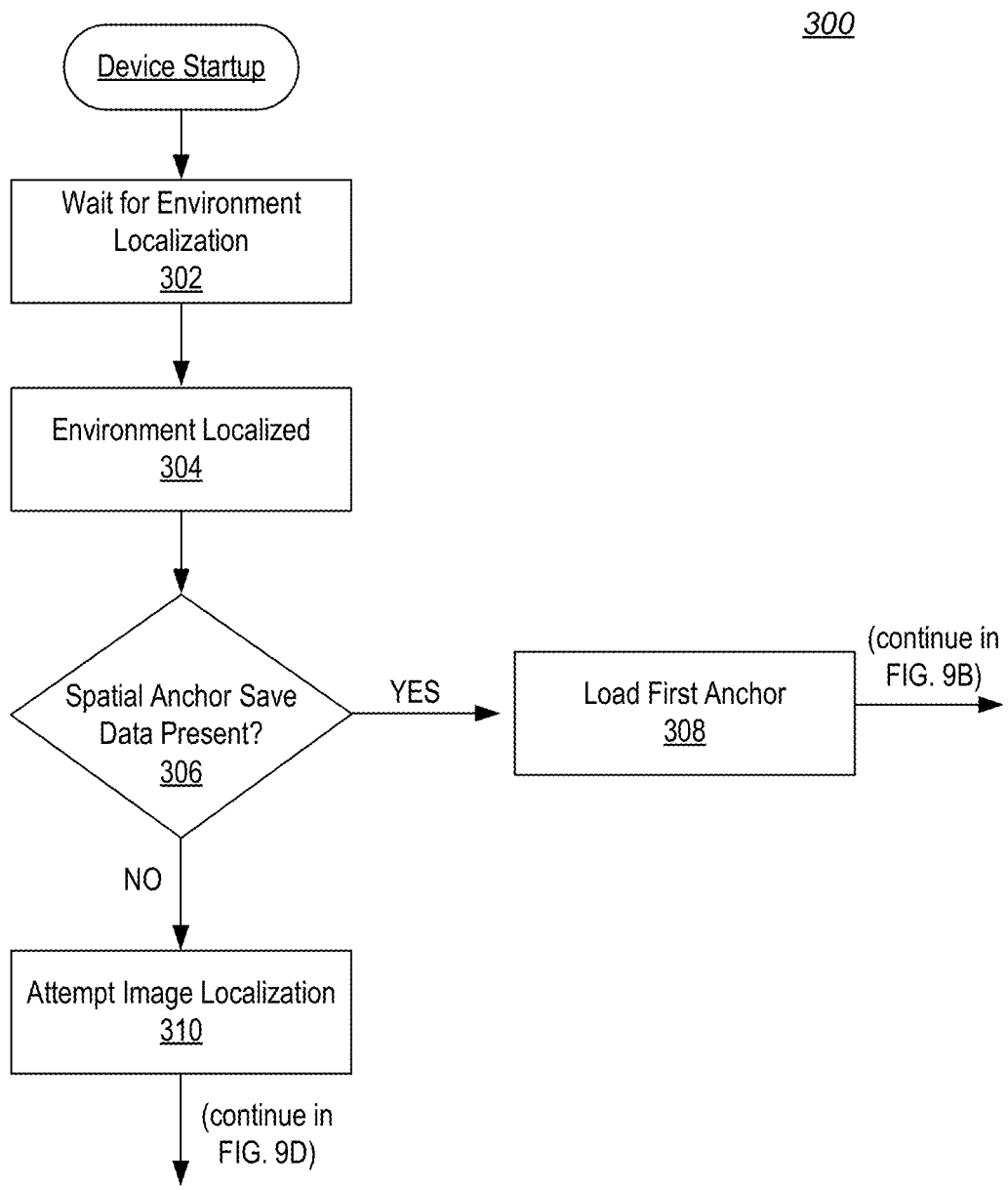
FIGS. 9A-9F show a continuous flow diagram illustrating a method for initial localization of one or more AR-capable devices within a controlled environment or space prior to commencing an AR experience or session.
Figure 9B:
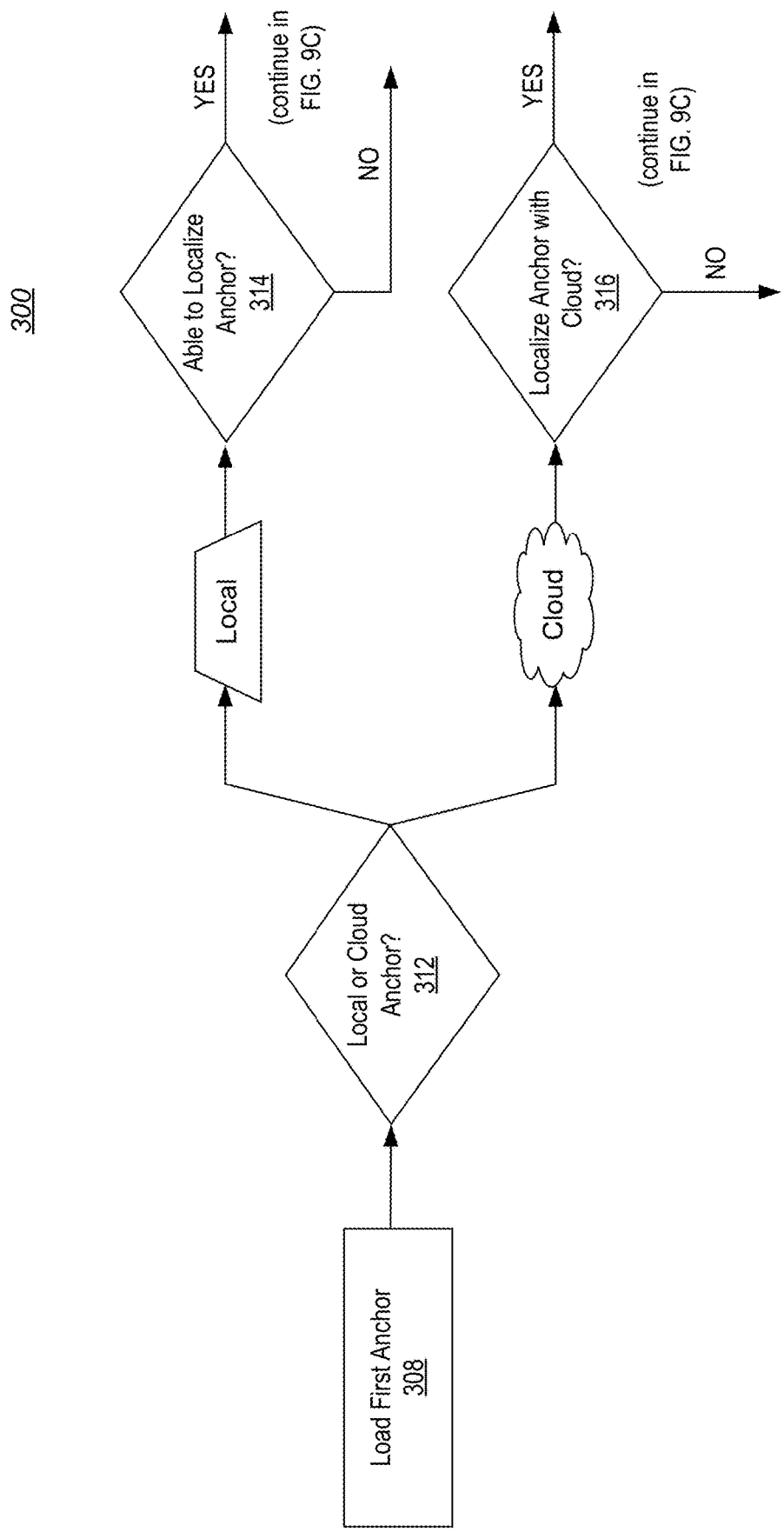
Figure 9C:
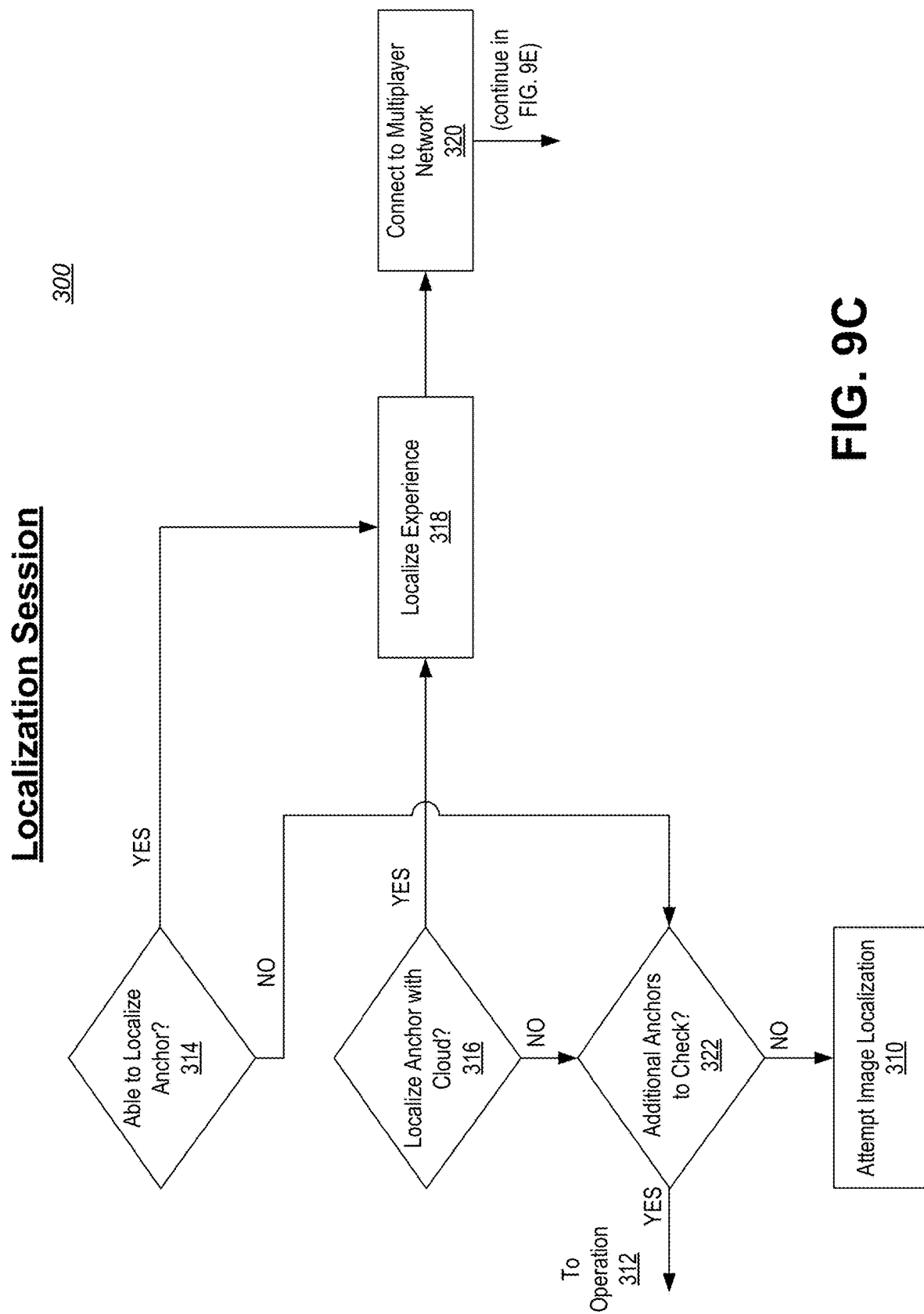
Figure 9D:
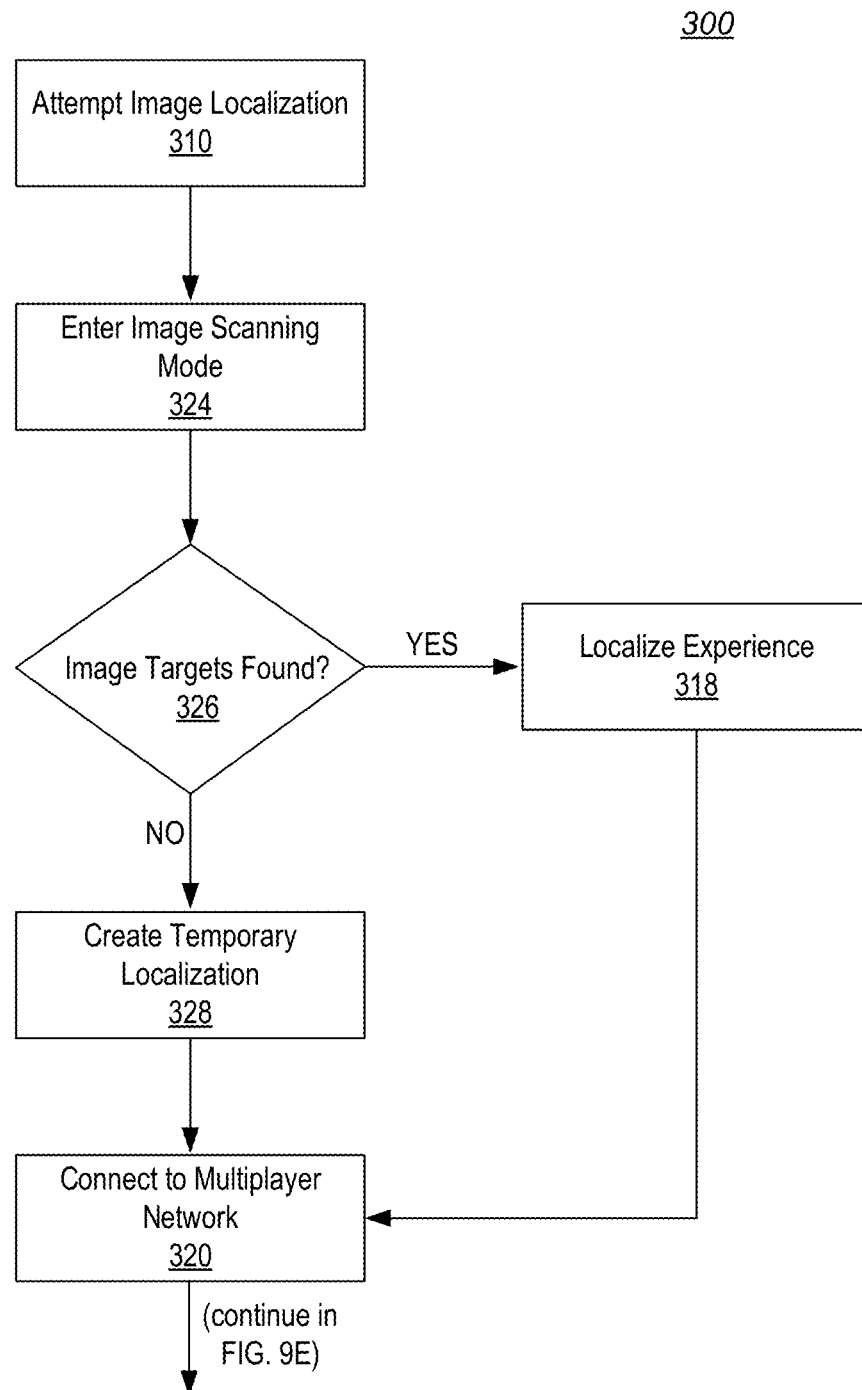
Figure 9E:
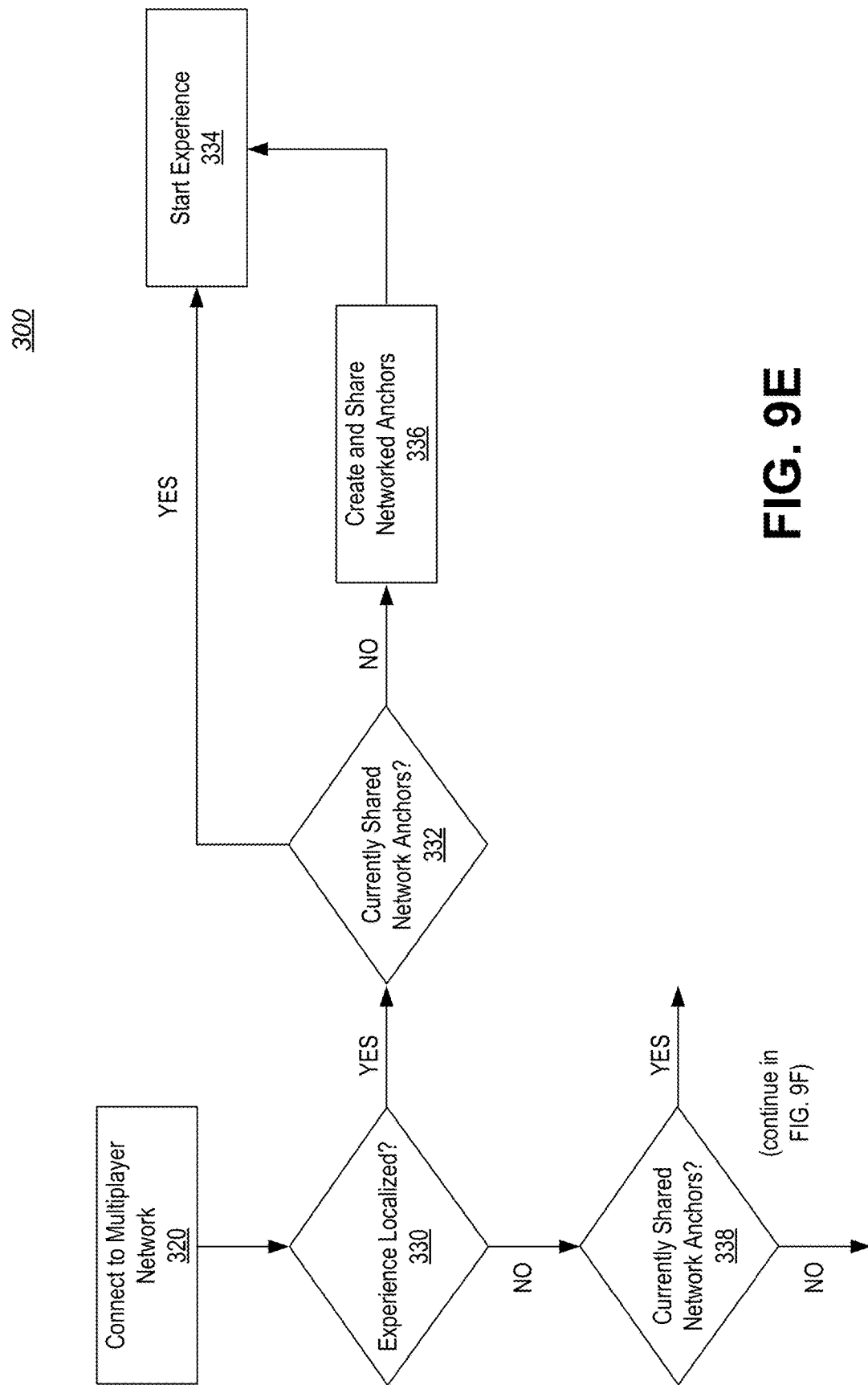
Figure 9F:
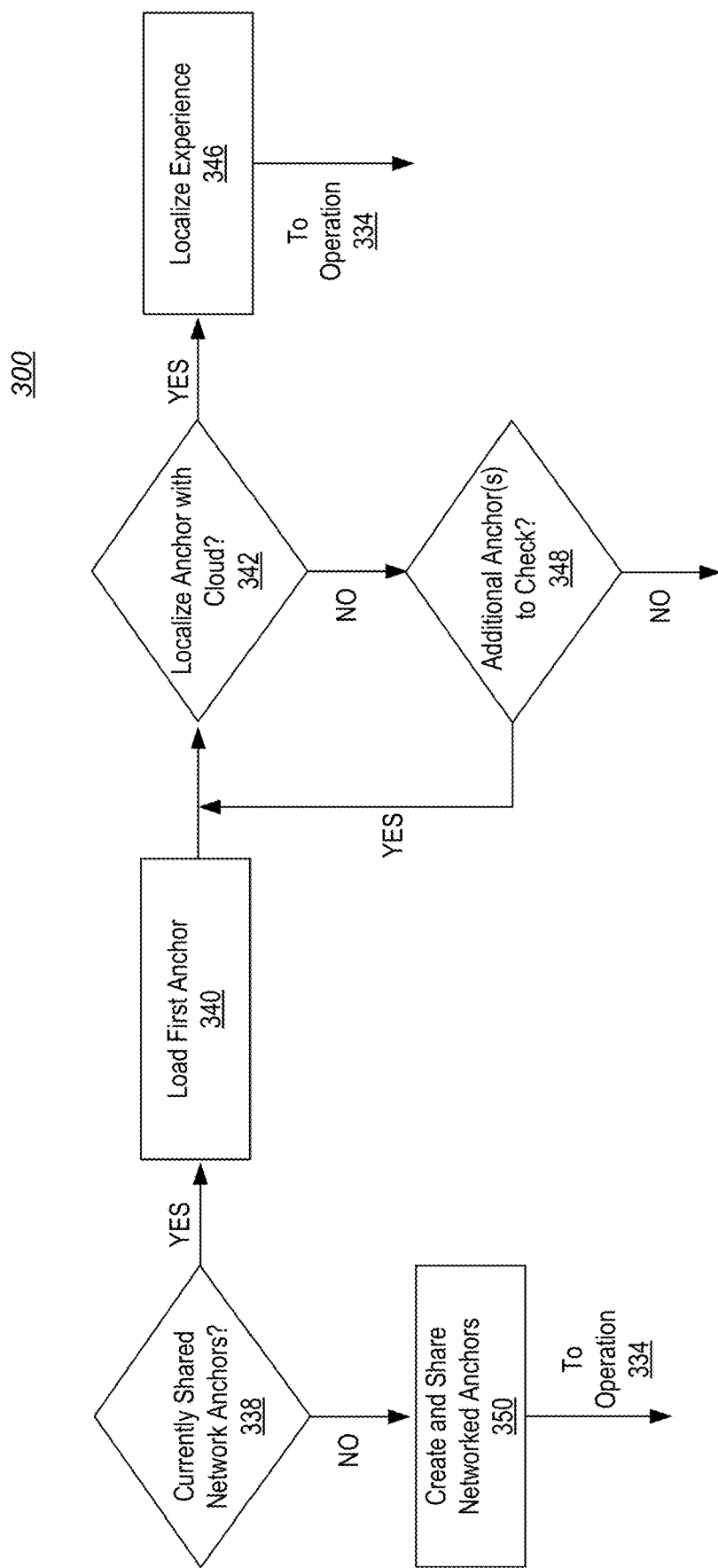

FIG. 8 is an exemplary layout of a venue comprised of multiple controlled spaces, each having space an established world origin point for a given attraction, at least one image tracking marker, and re-localization zones. As shown, guests may enter a first space (Space 1), in which each guest is equipped with an AR-capable device. Their devices will undergo an initial localization process, in which the device localizes to the map using at least one of the image tracking and cloud anchoring techniques previously described herein, depending on which technique is available. If both are available, the cloud anchoring localization takes priority. The next six spaces (Space 2 through Space 6) consist of exhibits, each including a controlled physical space providing a respective AR experience to multiple guests. Each of the exhibit spaces include re-localization areas or zones. As previously described, such zones may generally be implemented as re-localization points, in which any given user's proximity may be detected via a proximity sensor. Upon being detected, a re-localization process is initiated behind the scenes (the user is not aware). The docent may give an introduction to the area (space), thereby providing a bit more time for the re-localization process to complete, before moving into the room to receive the AR experience for that given space. It should be noted that, as a fallback option, image tracking markers may be placed throughout each space if needed. Further, as shown, re-localization points can be placed throughout a given AR experience at regular intervals that the guests must necessarily pass through and are encouraged to come closer as part of the attraction(s). Accordingly, the system 10 of the present invention provides for continuous re-alignment of the dynamic world origin point through a combination of the use of the physical image markers as well as disparate cloud services of each device to maintain the associated coordinates consistently across device software systems throughout the duration of each AR session/experience.

The venue may further include a couple final spaces in which the guests unload and remove the devices (space 7) once the AR experience is complete (once the guest has passed through all exhibits) and the guest can further and enter the gift shop (space 8) to purchase items or leave the venue.

FIGS. 9A-9F show a continuous flow diagram illustrating a method 300 for initial localization of one or more AR-capable devices within a controlled environment or space prior to commencing an AR experience or session. The method includes starting up the device (i.e., turning on the power) within the given space in which the AR experience will take place. Upon starting up the device, the user must wait for localization processes to begin within the given environment or space (operation 302), in which the device will be communicating with at least one of the AR platform 12 and remote server system(s) 14, exchanging data therewith. Upon localizing with the physical environment (operation 304), a determination is then made in operation 306 as to whether there is any saved spatial anchor data available or present. At this point, the databases 28 are analyzed to determine if any saved spatial anchor data is available. If it is determined in operation 306 that spatial anchor data is available/present, then a first anchor (presumably a first anchor tied to or associated with the saved spatial anchor data) is loaded (operation 308). A determination is then made in operation 312 as to whether the first anchor is local or a cloud anchor.

If it is determined that the first anchor is local, then a determination is made in operation 314 as to whether the local anchor is able to be localized. If it is determined that the local anchor is able to be localized, then an AR experience is localized (operation 316) and the device is then connected to the multiplayer/multi-user network (operation 320). If it is determined that the local anchor is unable to be localized, then a determination is made in operation 322 as to whether there are additional anchors (presumably tied to or associated with the saved spatial anchor data) to check. If it is determined that there are no additional anchors to check, then image localization (utilizing image tracking technology described herein) is attempted (operation 310). If it is determined that there are additional anchors to check, then the determination in operation 312 (as to whether the first anchor is local or a cloud anchor) is repeated.

If it is determined (in operation 312) that the first anchor is cloud-based, then a determination is made in operation 316 as to whether it is possible to localize the cloud-based anchor with the associated cloud-based server. If it is determined that the cloud-based anchor is able to be localized with the cloud, then an AR experience is localized (operation 316) and the device is then connected to the multiplayer/multi-user network (operation 320). If it is determined that the cloud-based anchor is unable to be localized with the cloud, then a determination is made in operation 322 as to whether there are additional anchors (presumably tied to or associated with the saved spatial anchor data) to check. If it is determined that there are no additional anchors to check, then image localization (utilizing image tracking technology described herein) is attempted (operation 310). If it is determined that there are additional anchors to check, then the determination in operation 312 (as to whether the first anchor is local or a cloud anchor) is repeated.

Reverting back to operation 306, if it is determined that there spatial anchor data is not available or present, then image localization is attempted (operation 310). Upon attempting image localization, the device enters an image scanning mode (operation 324). A determination is then made in operation 326 as to whether any image tracking targets or markers are found/detected. If it is determined that image tracker targets or markers are found/detected, then then AR experience is localized (operation 316) and the device is then connected to the multiplayer/multi-user network (operation 320). If it is determined that image tracker targets or markers are not found/detected, then temporary localization is created (operation 328) and the device is then connected to the multiplayer/multi-user network (operation 320).

Upon connecting to the multiplayer/multi-user network, a determination is then made in operation 330 as to whether the AR experience is localized. If it is determined that the AR experience is localized, then a subsequent determination is made in operation 332 as to whether there are any currently shared network anchors. If it is determined that there are currently shared network anchors, then the AR experience is started (operation 334). If it is determined that there are no currently shared network anchors, then networked anchors are created and shared (operation 336) and the AR experience is then started (operation 334).

If it is determined in operation 330 that the AR experience is not localized, then a determination is made in operation 338 as to whether there are any currently shared network anchors. If it is determined that there are currently shared network anchors available, then a first anchor is loaded (operation 340) and a subsequent determination is made in operation 342 as to whether the anchor can be localized with a cloud. If it is determined that the first anchor can be localized with a cloud, then an AR experience is localized (operation 346) and the AR experience is started (operation 334). If it is determined that the first anchor is unable to be localized with a cloud, then a determination is made in operation 348 as to whether there are additional anchors to check. If it is determined that there are additional anchors to check, then the determination in operation 342 is repeated.

Reverting back to operation 338, if it is determined that there are no currently shared network anchors, then networked anchors are created and shared (operation 350), and then the AR experience is started (operation 334).

Figure 10:
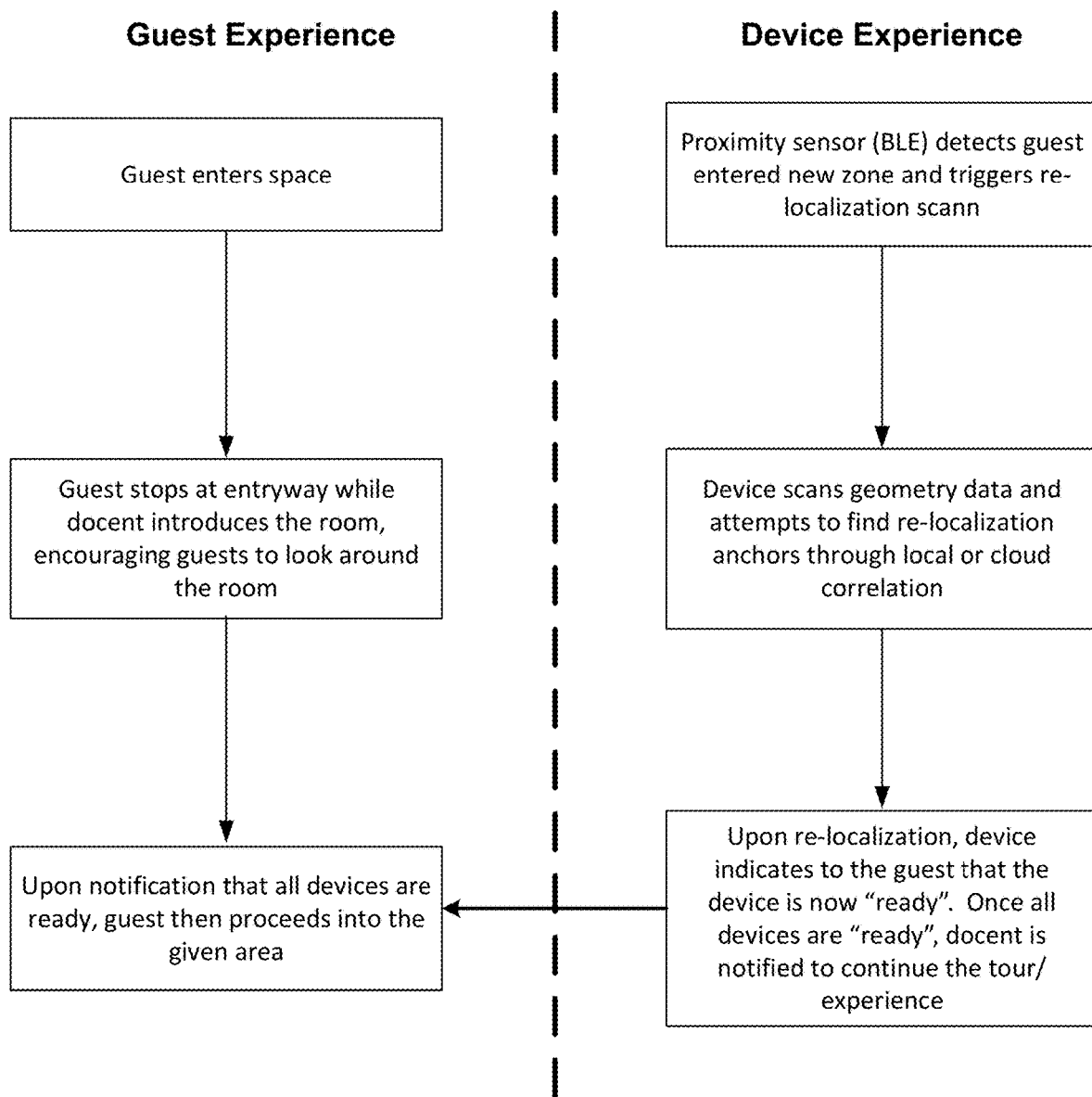
FIG. 10 is a block diagram of one embodiment of a method for initiating a re-localization session of an AR-enabled device.
Figure 11:
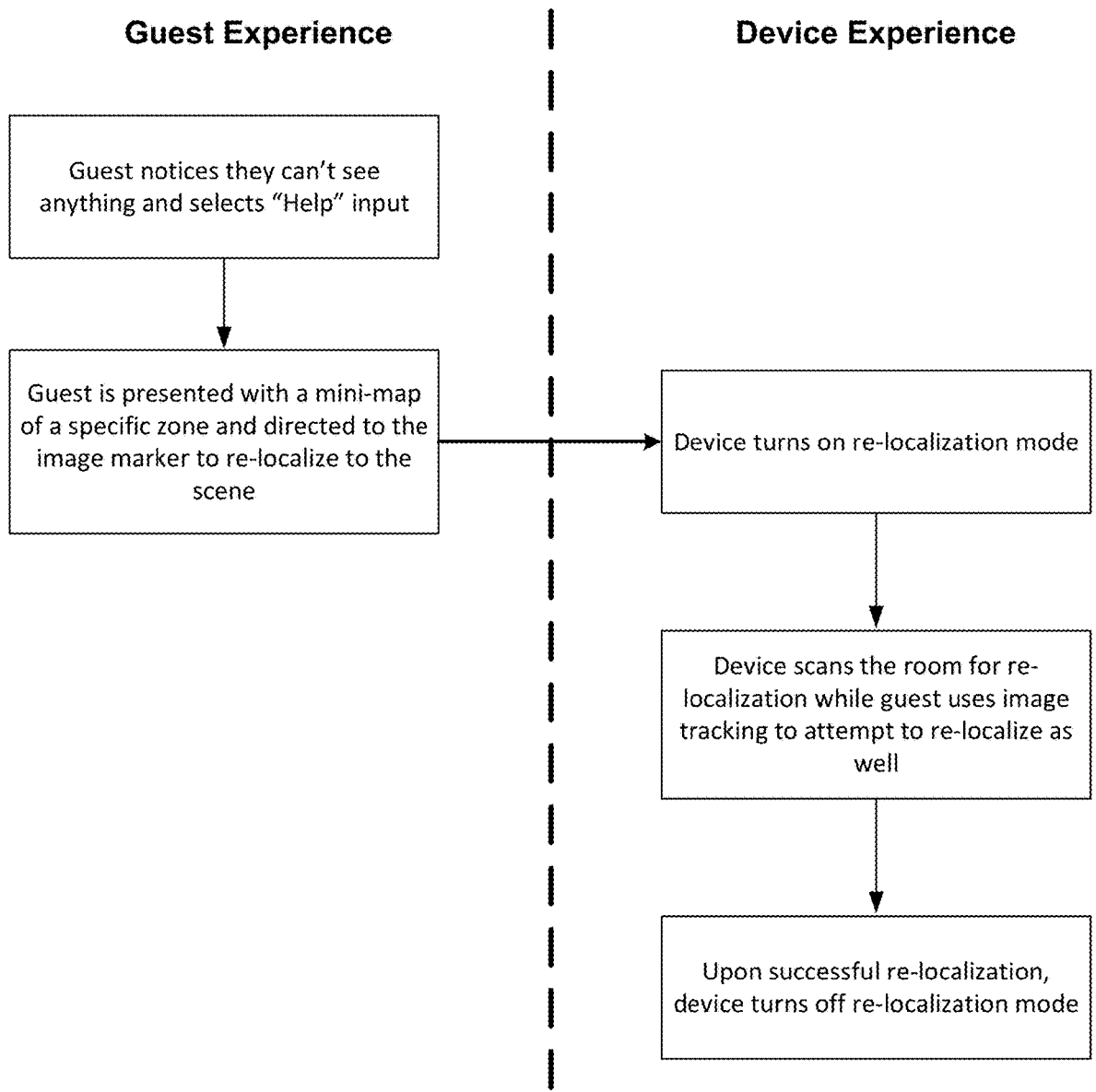
FIG. 11 is a block diagram of another embodiment of a method for initiating a re-localization session of an AR-enabled device.
Figure 12:
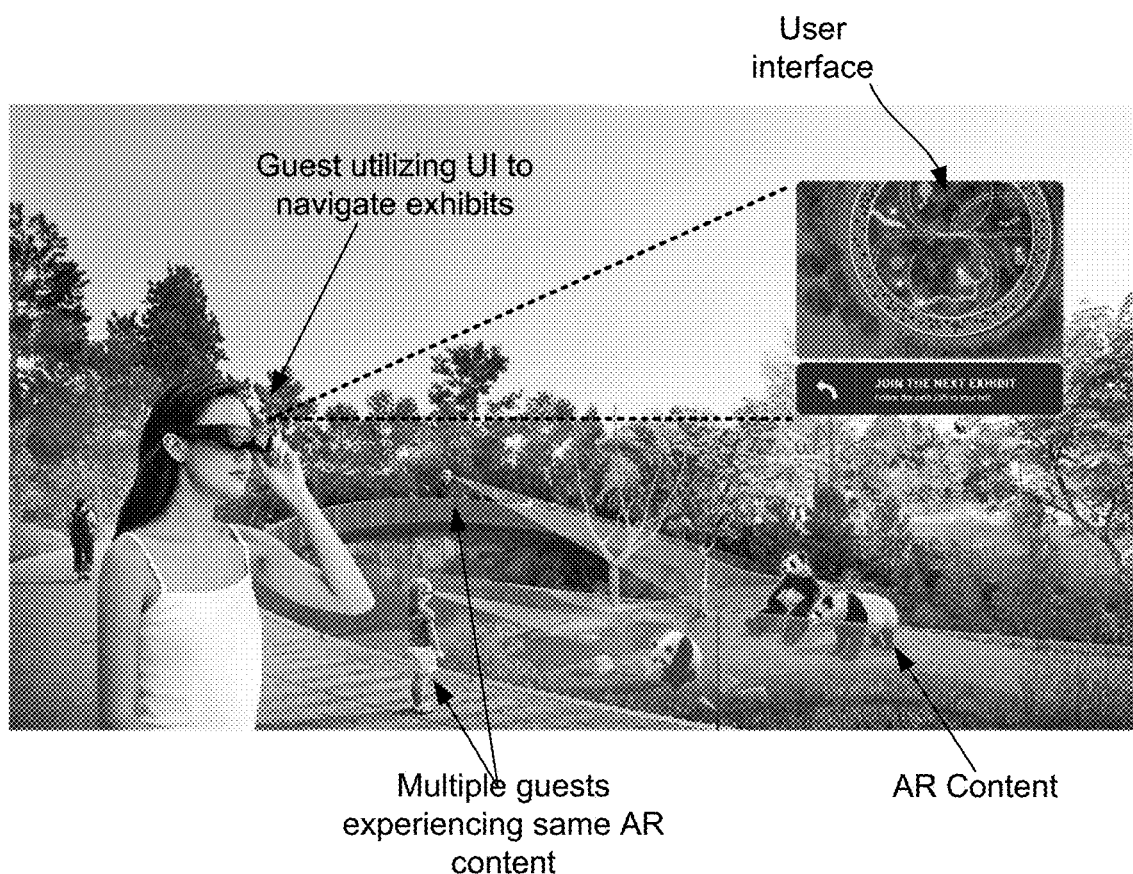
FIGS. 12-20 are images depicting various implementations and uses of the system of the present invention.
Figure 13:
Figure 14:
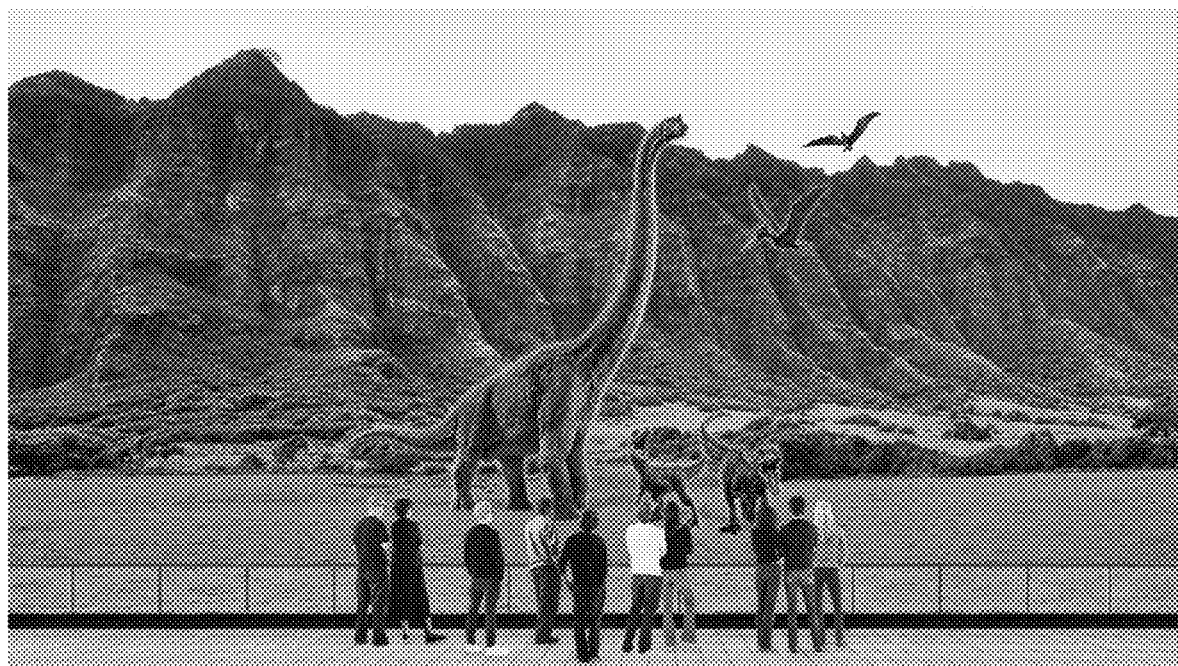
Figure 15:
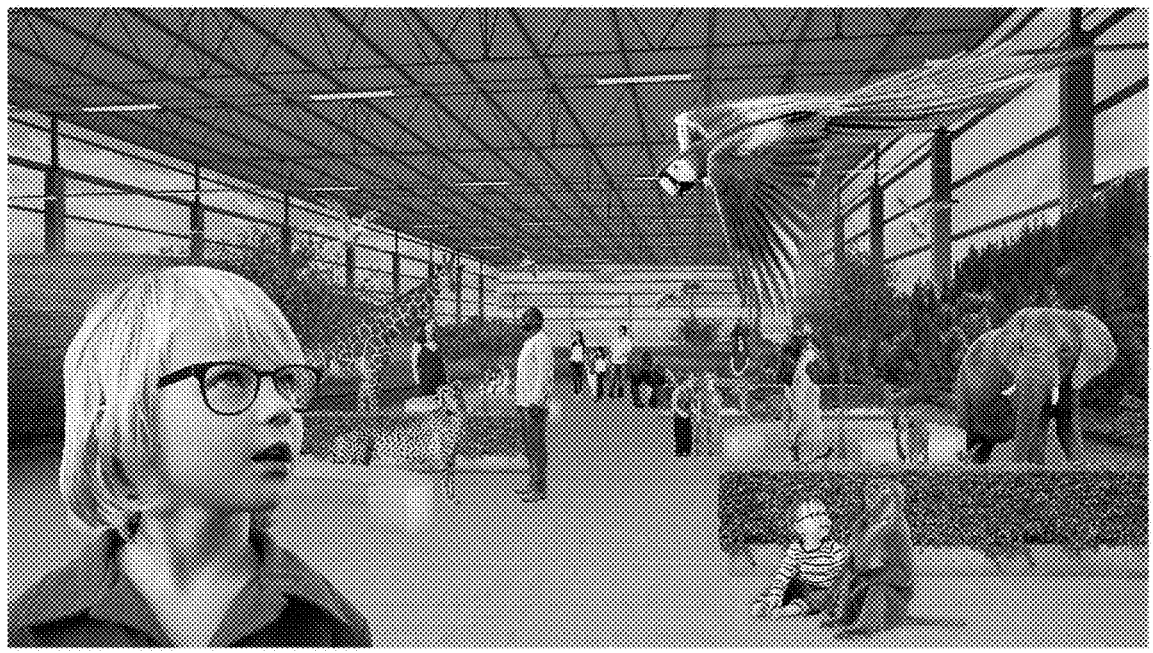
Figure 16:
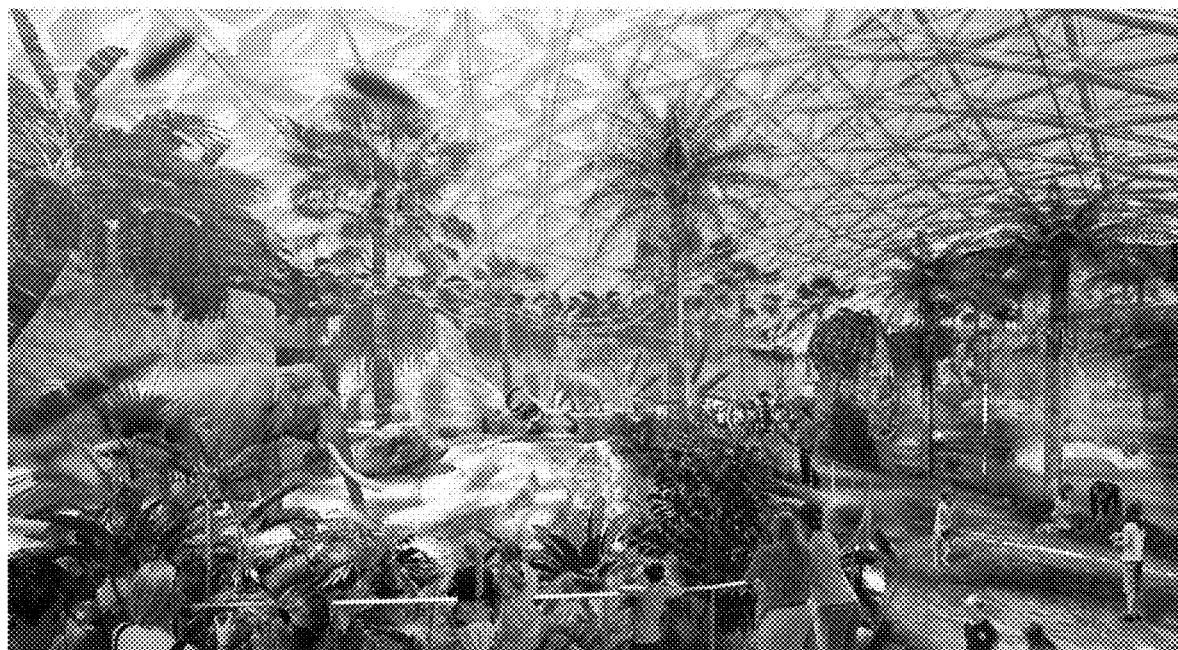

FIG. 10 is a block diagram of one embodiment of a method for initiating a re-localization session of an AR-enabled device. FIG. 11 is a block diagram of another embodiment of a method for initiating a re-localization session of an AR-enabled device.

The method illustrated in FIG. 10 generally corresponds to a scenario in which a guest is at a venue comprised of multiple controlled spaces, such as an AR-based zoo with multiple exhibits. In the first scenario (see FIG. 10) a guest may generally enter a controlled space with the associated AR-capable device. Upon entering the space, a proximity sensor (such as a BLE sensor) detects that the guest entered a new zone (see FIG. 8), and triggers a re-localization scanning event. The guest stops at an entryway while the docent introduces the room, encouraging guests to look around the room. As the guest is stopped at the entryway, the device scans the geometry data and attempts to find re-localization anchors through local or cloud correlation/comparison. Upon re-localization, the device indicates to the guest that the device is now "ready". Once all of the devices from each of the guests within that space are "ready", then the docent is notified to continue the tour/experience. Accordingly, upon receiving the "ready" notification, the guest then proceeds into the given space to continue the AR experience.

The method illustrated in FIG. 11 generally corresponds to a scenario in which a guest is having difficulties with their AR experience, such as poor feedback or visibility of AR content. Accordingly, the guest may utilize an interface to select a help or assistance feature. In turn, the guest may be presented with a mini-map or layout of a specific zone or space and they may be directed to the nearest image tracking marker associated with that given zone or space so as to re-localize to the specific scene based on image tracking localization techniques described herein. In turn, the device turns on the re-localization mode and beings scanning the given space for re-localization while the guest uses image tracking to attempt to re-localize as well. Upon successful re-localization, the device turns off the re-localization mode and the AR experience resumes.

By providing a truly immersive and shared AR experience, systems of the present invention can be particularly beneficial in various industries that cater to, or otherwise rely on, multiple guests, participants, patrons, or the like.

In the present context, depending on the specific AR experience to be provided and the particular use of the system, the users may include guests, patrons, participants, students, or the like. For example, in one example, the system of the present invention may be particularly useful in the entertainment industry in which a given venue provides entertainment to multiple guests or patrons at once, such as a zoo, theme park, sporting event, or the like. Similarly, the systems of the present invention may be useful for educational purposes (i.e., classroom environment in which instructor and associated course lesson is provided to multiple students via an AR experience provided on each student's AR-capable device) or military and/or law enforcement exercises (i.e., soldiers, military personnel, police officers, etc.) can train via customized training scenarios provided via an AR experience, including multi-user combat situations).

FIGS. 12-20 are images depicting various implementations and uses of the system of the present invention.

FIGS. 12-16 are images depicting an AR-based zoo experience for multiple guests within controlled spaces (i.e., specific "exhibits"), in which systems of the present invention provide synchronized sharing of zoo-based AR content (i.e., zoo-related animals) in real time and across multiple AR-capable devices (i.e., wearable headsets and/or personal computing devices, such as a smartphone or tablet).

Figure 17:

FIG. 17 is an exemplary layout or map of an AR-based zoo experience, illustrating the various "exhibits".

Figure 18:

FIG. 18 is an image depicting an AR-based classroom experience, in which the instructor and associated course content is provided to multiple students via an AR experience.

Figure 19:
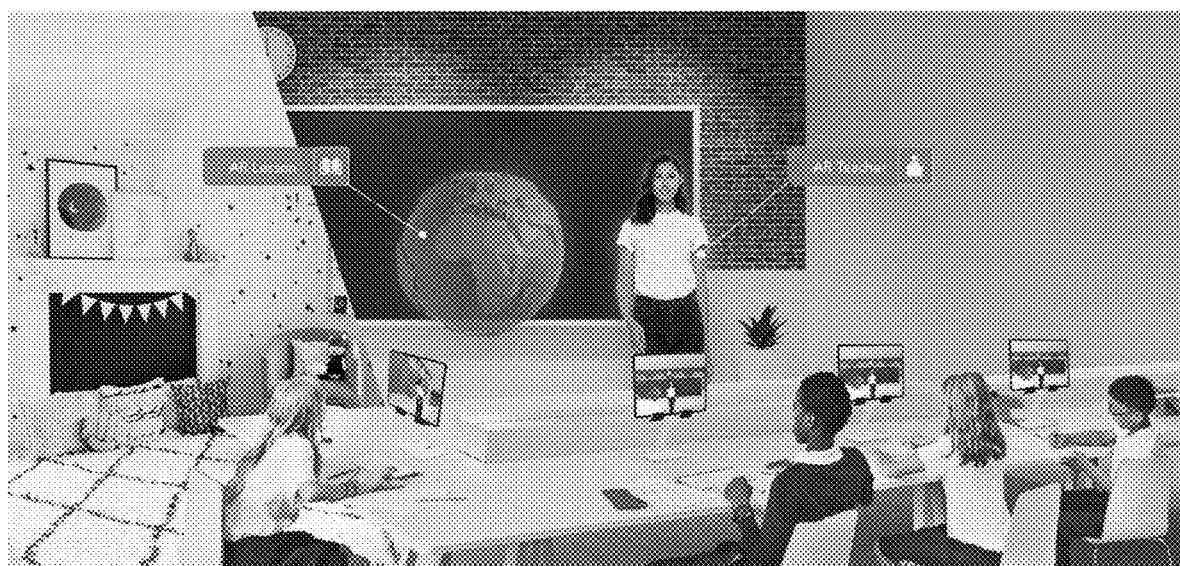

FIG. 19 is an image depicting another embodiment of an AR-based classroom experience, in which the instructor and associated course content/lesson is provided to multiple students via an AR experience, wherein each student is viewing and interacting with the course content/lesson and instructor via a tablet computing device, further illustrating the multiple point of views for each student, adding to the realism and feel. Such an experience is particularly useful for distance education, such as remote learning or the like.

Figure 20:

FIG. 20 is an image depicting an AR-based military experience, in which multiple soldiers are provided with a military training scenario.

Accordingly, the system of the present invention addresses the drawbacks of current augmented reality systems by recognizing the potential of how experiential augmented reality can be when experiencing such content together by many at the same time. The AR platform provides for synchronized sharing of AR content in real time and across multiple AR-capable devices, thereby allowing multiple users to experience the same AR content rendering in real time and within a live, physical environment or space, wherein such rendering of AR content is adapted to each user's point of view. The synchronization of content allows for multiple users within the given space to more naturally interface with the shared AR content as well as observe an identical combination of digital and physical reality, thereby simultaneously experiencing and interacting with augmented reality environments. The AR platform allows for the display AR content within the same physical location and orientation across multiple AR-capable devices, regardless of the devices being from identical or different manufactures. Furthermore, by combining different device types together, the system of the present invention is accessible by most device owners, providing handheld mobile AR (i.e., by way of smartphones or tablets) to more expensive lightweight eyewear. Furthermore, by integrating and leveraging multiple technologies (i.e., image tracking technology, cloud-based anchor systems, local persistent anchoring systems, and re-localization proximity sensors), the system of the present invention is able to ensure constant re-localization that does not depend solely on a single technology. Based on the communication capabilities, via the AR platform, reliability can be shared across the different platforms, thereby improving the overall AR experience by countering drift.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

The invention claimed is:

1. An augmented reality (AR) platform configured to communicate and exchange data with a plurality of augmented reality (AR)-capable devices over a network, the plurality of AR-capable devices provide respective users with an augmented view of a real-world environment and each comprises an associated localization system that is specific to a platform of the respective AR-capable device, wherein the AR platform is configured to synchronize sharing of augmented reality content in real time across the plurality of AR-capable devices within the real-world environment, the AR platform comprising a hardware processor coupled to non-transitory, computer-readable memory containing instructions executable by the processor to cause the AR platform to:

receive, from each of the plurality of AR-capable devices, localization data for establishing a location of a respective AR-capable device within the real-world environment, wherein the localization data is based on a platform-specific localization algorithm run by each AR-capable device to thereby localize the respective AR-capable device within the real-world environment, wherein at least a first AR-capable device provides localization data associated with an anchor-based system and at least a second AR-capable device provides localization data associated with an image tracking-based system;

process the localization data, including synchronously aligning the localization data from each of the AR-capable devices relative to a shared, fixed origin point within the real-world environment, and assign a location of each AR-capable device relative to a shared, fixed origin point within the real-world environment, wherein the shared, fixed origin point comprises position data associated with a specific physical location and orientation within the real-world environment to which AR content is to be associated; and transmit AR content to each of the AR-capable devices, the AR content configured to be displayed and rendered by each AR-capable device based, at least in part, on the assigned location of each respective AR-capable device, in which visual presentation of the AR content is adapted to each respective user's point of view as a result of the assigned location within the real-world environment relative to the shared, fixed origin point.

2. The AR platform of claim 1, wherein the AR-capable devices comprise at least one of a smartphone, a tablet, and a wearable headset or eyewear.

3. The AR platform of claim 2, wherein the AR platform is configured to receive additional data from each of the AR-capable devices associated with at least one of, a point of gaze of the associated user within the real-world environment, a field of view of the user within the real-world environment, and a physical setting and objects within the real-world environment.

4. The AR platform of claim 3, wherein each of the AR-capable devices comprises one or more sensors selected from the group consisting of a camera, a motion sensor, and a global positioning satellite (GPS) sensor.

5. The AR platform of claim 4, wherein the motion sensor is selected from the group consisting of an accelerometer, an altimeter, one or more gyroscopes, other motion or movement sensors to produce sensory signals corresponding to motion or movement of the AR-capable device, and a magnetometer to produce sensory signals from which direction of travel or orientation of the AR-capable device can be determined.

6. The AR platform of claim 2, wherein each AR-capable device comprises a display unit for providing respective users with an augmented view of the real-world environment.

7. The AR platform of claim 6, wherein the display unit comprises a lens and a digital display.

8. The AR platform of claim 7, wherein, when wearing the headset or eyewear, a user can view the real-world environment through at least a portion of the lens and view AR content projected via the digital display as objects in the real-world environment.

9. The AR platform of claim 6, wherein said display unit comprises a digital display selected from the group consisting of a light-emitting diode (LED) projector and/or display, an organic light-emitting diode (OLED) projector and/or display, a liquid crystal display (LCD), a liquid crystal on silicon (LCOS) projector and/or display, and a microdisplay and/or microprojector.

10. The AR platform of claim 1, wherein processing of the localization data comprises synchronous alignment of the localization data from each of the AR-capable devices relative to the shared, fixed origin point within the real-world environment.

11. The AR platform of claim 10, wherein the AR content is configured to be displayed and rendered by each AR-capable device such that one or more digital images associated with the AR content appears at an identical location within the real-world environment.

12. The AR platform of claim 1, wherein the real-world environment is associated with an area of interest or attraction.

13. The AR platform of claim 12, wherein the real-world environment is associated with a zoo.

14. The AR platform of claim 12, wherein the real-world environment is associated with a stadium or other setting for sporting events, concerts, or other entertainment-related events.

15. The AR platform of claim 1, wherein the AR content comprises one or more objects rendered as an overlay on the real-world environment.

16. The AR platform of claim 15, wherein the AR content comprises a game.

17. The AR platform of claim 15, wherein the AR content comprises an interactive game experience.

18. The AR platform of claim 15, wherein the AR content is selected from the group consisting of a virtual object, a digital image, a digital video, an application, a script, a promotion, an advertisement, a graphic, and an animation.

19. The AR platform of claim 1, wherein the anchor-based system comprises a cloud anchor system.

20. The AR platform of claim 1, wherein the anchor-based system comprises a persistent anchor system.

* * * * *